United States Patent
Balembois et al.

(10) Patent No.: US 12,483,000 B2
(45) Date of Patent: Nov. 25, 2025

(54) T-SHAPED LASER PUMPING DEVICE

(71) Applicants: CENTRE NATIONAL DE LA RECHERCHE SCIENTIFIQUE, Paris (FR); INSTITUT OPTIQUE THEORIQUE APPLIQUEE, Palaiseau (FR); Universite Paris-Saclay, Gif-sur-Yvette (FR)

(72) Inventors: François Balembois, Boissy le Sec (FR); Pierre Pichon, Palaiseau (FR)

(73) Assignees: CENTRE NATIONAL DE LA RECHERCHE SCIENTIFIQUE, Paris (FR); INSTITUT OPTIQUE THEORIQUE APPLIQUEE, Palaiseau (FR); UNIVERSITE PARIS SACLAY, Gif-sur-Yvette (FR)

( * ) Notice: Subject to any disclaimer, the term of this patent is extended or adjusted under 35 U.S.C. 154(b) by 617 days.

(21) Appl. No.: 17/913,424

(22) PCT Filed: Mar. 23, 2021

(86) PCT No.: PCT/EP2021/057467
§ 371 (c)(1),
(2) Date: Sep. 21, 2022

(87) PCT Pub. No.: WO2021/191221
PCT Pub. Date: Sep. 30, 2021

(65) Prior Publication Data
US 2023/0112416 A1 Apr. 13, 2023

(30) Foreign Application Priority Data

Mar. 24, 2020 (FR) .................................. 2002852
Jan. 15, 2021 (FR) .................................. 2100384

(51) Int. Cl.
*H01S 3/0933* (2006.01)
*H01S 3/06* (2006.01)
(Continued)

(52) U.S. Cl.
CPC .......... *H01S 3/0933* (2013.01); *H01S 3/0604* (2013.01); *H01S 3/08095* (2013.01); *H01S 3/1623* (2013.01)

(58) Field of Classification Search
CPC ................. H01S 3/0933; H01S 3/0604; H01S 3/08095
See application file for complete search history.

(56) References Cited

FOREIGN PATENT DOCUMENTS

| FR | 3045965 A1 * | 6/2017 | ........... H01S 3/0933 |
| FR | 3 045 965 B1 | 5/2018 | |
| JP | H0292959 U | 7/1990 | |

OTHER PUBLICATIONS

Barbet, et al., "Light-emitting diode pumped luminescent concentrators: a new opportunity for low-cost solid-state lasers", Optica, vol. 3, Issue 5, pp. 465-468, 2016.
(Continued)

*Primary Examiner* — James A Menefee
(74) *Attorney, Agent, or Firm* — Maier & Maier, PLLC

(57) ABSTRACT

A laser pumping assembly includes a parallelepipedal solid laser medium having the shape of a plate in a horizontal plane (xy) and a thickness $e_L$, the laser medium having an absorption spectral band and an associated absorption coefficient $\alpha$; at least one light emission module intended to pump the laser medium, comprising a fluorescent parallelepipedal crystal called a concentrator, having the shape of a plate of thickness $e_c$, the concentrator having at least one illumination face illuminated by electroluminescent radiation and being configured to absorb the electroluminescent radiation and emit fluorescence radiation in a spectral range exhibiting an overlap with the absorption spectral band, the
(Continued)

concentrator having an emitting face; the concentrator being in optical contact, via the emitting face, with a receiving face of the laser medium, the concentrator being arranged perpendicular to the laser medium such that the one or more illumination faces are perpendicular to the receiving face so as to perform transverse pumping of the laser medium, the optical contact being designed such that a portion of the fluorescence radiation trapped in the concentrator by total internal reflection is able to pass into the laser medium by passing through the emitting face, and be trapped in the laser medium by total internal reflection, the thickness $e_l$ of the laser medium being such that $e_L \leq L_{abs}/5$ where $L_{abs}=1/\alpha$ is an absorption length of the laser medium.

15 Claims, 18 Drawing Sheets

(51) Int. Cl.
    *H01S 3/08*     (2023.01)
    *H01S 3/16*     (2006.01)

(56) References Cited

OTHER PUBLICATIONS

Pichon, et al., "Light-emitting diodes: a new paradigm for Ti:sapphire pumping", Optica, vol. 5, Issue 10, pp. 1236-1239, 2018.
Pichon, et al., "LED-pumped alexandrite laser oscillator and amplifier", Proceedings of the SPIE, vol. 10511, p. 105111J 11, 2018.

* cited by examiner

T-SHAPED LASER PUMPING DEVICE

CROSS-REFERENCE TO RELATED APPLICATION

This application is a National Stage of International patent application PCT/EP2021/057467, filed on Mar. 23, 2021, which claims priority to foreign French patent application No. FR 2100384, filed on Jan. 15, 2021, and French patent application No. FR 2002852, filed on Mar. 24, 2020, the disclosures of which are incorporated by reference in their entireties.

FIELD OF THE INVENTION

The present invention relates to the field of light-emitting-diode (LED)-pumped laser devices, and more particularly to that of light-emitting-diode-pumped laser devices using luminescent concentrators.

BACKGROUND

The development of light-emitting diodes (LEDs) emitting in the visible is of great interest for the pumping of new low-cost, highly robust laser sources. However, the power density of LEDs does not exceed 4 W/mm$^2$ in pulsed mode (μs) and 1 W/mm$^2$ in steady state. These values are insufficient to pump certain laser media, such as for example transition-metal lasers (alexandrite, Cr:LiSAF or titanium-doped sapphire).

One solution for increasing light intensity is that of using LED-pumped light concentrators (see for example Barbet, Adrien, et al. "Light-emitting diode pumped luminescent concentrators: a new opportunity for low-cost solid-state lasers." Optica 3.5 (2016): 465-468.). This concentrator is for example a crystal that is fluorescent in the visible (red-orange) such as Ce:YAG, which absorbs in the blue (toward 450 nm), at a wavelength at which the LEDs exhibit very good performance. The crystal is sized in the form of a plane, covered with hundreds (or even thousands) of LEDs over the two major surfaces and with edge emission.

FIGS. 1A and 1B illustrate one example of an emission module ME known from the prior art and suitable for the pumping of a laser medium Las, not shown in these figures. FIGS. 1A and 1B schematically show respective perspective and side views of one and the same emission module ME. The emission module ME comprises a set of LEDs intended to emit in a first spectral band and a light concentrator CL. The concentrator CL is a fluorescent parallelepipedal crystal, having at least one illumination face $SI_1$, $SI_2$ illuminated by the electroluminescent radiation $L_d$ emitted by the LEDs.

The crystal of the concentrator is configured to absorb said electroluminescent radiation $L_d$. The luminous flux emitted by the LEDs and directed toward the illumination face is absorbed by luminophores Lum of the fluorescent crystal that are distributed throughout the volume of the crystal and that then emit fluorescence radiation within the crystal. The emitted rays may be classified into three categories:

trapped rays, denoted $L_p$: these rays are trapped in the crystal due to total internal reflection (TIR) from the various faces of the crystal. These rays exist if the crystal is a parallelepiped having 6 faces that are parallel in pairs and perpendicular to one another. The trapped rays never exit the crystal, except for as a result of imperfections thereof.

untrapped rays are rays that end up exiting the crystal. These are split into two categories: guided rays, denoted $L_g$, the characteristic of which is that of being guided by TIR and exiting from one of the faces of the concentrator, and unguided rays, denoted Lout, which exit the concentrator directly without being reflected from the faces.

Although the increase in illumination provided by a concentrator is very significant in comparison with LEDs, the illumination remains poor in comparison with the illumination provided by laser diodes, for example. This makes longitudinal pumping very difficult for a concentrator. On the other hand, transverse pumping is possible, as shown in the article by Barbet et al. In addition, the radiation emitted by a concentrator is highly divergent. This renders the use of any optical coupling system ineffective and therefore encourages a move to a geometry in which the concentrator is very close to the crystal to be pumped, without any optical intermediary.

In conventional transverse pumping (using a flash lamp or using a laser diode), a beam called a pump beam Pump illuminates a laser medium Las with an average propagation direction perpendicular to the propagation direction of the laser beam Sig (see left-hand part of FIG. 2A). This laser medium Las has an absorption spectral band and an associated absorption efficient α. As soon as it enters the laser medium Las, the pump beam Pump experiences exponential absorption with transmission in the form $T=e^{-\alpha L}$, where α is the absorption coefficient. In the case of optical pumping with a single light source, it is necessary for the volume of the laser beam to be amplified to coincide as best possible with the area where the absorption is present. However, it is difficult to bring the laser beam close to the location where the absorption is highest. Indeed, well-known diffraction effects on the side of the crystal (pump side) will create losses and deformations for the laser beam. Assuming that the laser beam Sig is cylindrical and that its diameter in the laser medium is d, it is difficult to bring the laser beam Sig to less than a distance d/2 from the pumping entrance surface. In the case of a collimated pump beam, a simple calculation demonstrates that, for a fixed value d, the gain $G_0$ of the laser averaged over the beam has the trend described by the curve in the right-hand part of FIG. 2A. It reaches a maximum value for a product α. d=1. This is tantamount to stating that the absorption length, $L_{abs}=1/\alpha$, has to be equal to the diameter d of the beam in the case of transverse pumping. Thus, the greater a diameter d of the laser beam, the less a laser crystal will have to absorb. The further it is necessary to position the signal beam Sig from the side of the crystal (ideally at d/2), the lower the gain will be. This point is particularly problematic for high-energy beams that may exceed the optical damage threshold for the entrance face of the laser crystal. In this case, it is necessary to work with beams with a large surface area, up to a few centimeters in diameter.

A first way of using the concentrators would be to position a concentrator ME as close as possible to a laser medium ML and to perform transverse pumping in the same way as other light sources are used for this type of pumping (as in FIG. 2A). For this purpose, consideration is given to a "laser+concentrator" pumping assembly suitable for performing transverse pumping, the dimensions of which are denoted (see FIG. 2B):

for the concentrator ME: $e_c$ for the thickness, we for the width and $L_c$ for the length of the concentrator;

for the laser medium ML: $e_L$ for the thickness, for the width and $L_L$ for the length (which is parallel to the axis of propagation of the laser beam).

In the example illustrated, the two media are matched, that is to say that the width of the concentrator is equal to the length of the laser medium: $w_c = L_L$. The concentrator is brought against the laser medium so as to allow good coupling of pump light into the laser medium. At the output of an LED-pumped concentrator, the beam diverges greatly. In a conventional case, such as for example strips of laser diodes placed close to the laser medium, with a laser medium thicker than the concentrator ($e_L > ec$), in which the pump rays are absorbed before touching the sides of the laser medium, the pumping volume will be of the order of $\pi/4 \cdot L_{abs}^2 \cdot w_c$. The pumping light will therefore be diluted in the laser medium, this not being favorable for a high gain, denoted $G_0$, which depends on the population inversion volume density, denoted $\Delta n_0$. It will be recalled that these two quantities are linked by the following formula: $G_0 = \exp(\sigma \Delta n_0 L_L)$. In the devices from the prior art, the pump power volume density is therefore conditional upon the volume of the laser medium, whose dimensions transverse to the laser beam must be sufficient to allow absorption of the pump beam before this emerges from the laser medium.

SUMMARY OF THE INVENTION

The invention aims to overcome some problems from the prior art. It consists in using the very specific radiation of the rays trapped in the concentrator in combination with a laser crystal of appropriate form, greatly reducing the pump volume. More precisely, the invention aims to produce a laser assembly comprising an emission module comprising a light concentrator transversely pumping a laser medium configured to increase the pump power volume density and thus make it possible to amplify laser beams more strongly than the prior art.

To this end, one subject of the invention is a laser pumping assembly comprising:
- a parallelepipedal solid laser medium having the shape of a plate in a horizontal plane and a thickness $e_L$, said laser medium having an absorption spectral band and an associated absorption coefficient $\alpha$;
- at least one light emission module intended to pump the laser medium, comprising:
- a plurality of light-emitting diodes configured to emit electroluminescent radiation at a wavelength $\lambda_d$;
- a fluorescent parallelepipedal crystal called a concentrator, having the shape of a plate of thickness $e_c$, said concentrator having at least one illumination face illuminated by said electroluminescent radiation and being configured to absorb said electroluminescent radiation and emit fluorescence radiation in a spectral range exhibiting an overlap with said absorption spectral band, said concentrator having an emitting face having dimensions $e_c \times w_c$, $w_c$ being a width of the concentrator;

said concentrator being in optical contact, via said emitting face, with a receiving face of the laser medium, said concentrator being arranged perpendicular to the laser medium such that the one or more illumination faces are perpendicular to said receiving face so as to perform transverse pumping of said laser medium, the optical contact being designed such that a portion of said fluorescence radiation trapped in the concentrator by total internal reflection is able to pass into the laser medium by passing through said emitting face, and be trapped in the laser medium by total internal reflection, said thickness $e_l$ of the laser medium such that $e_L \leq L_{abs}/5$ where $L_{abs} = 1/\alpha$ is an absorption length of the laser medium.

According to some particular modes of the invention:
- a ratio between a surface area of the receiving face of the laser medium and a surface area of the emitting face of the concentrator is greater than 5, and a ratio between a surface area of the illumination face of the concentrator and a surface area of the emitting face of the concentrator is greater than or equal to 100;
- the laser pumping assembly comprises at least a first recycling mirror coupled to an exit face of the concentrator, opposite said emitting face and/or a second recycling mirror coupled to a face of the laser medium opposite said receiving face;
- a laser system comprises the laser pumping assembly according to the invention and at least two cavity mirrors so as to form a laser cavity in which the assembly is arranged, a laser beam propagating in said laser medium in a propagation direction, passing through two opposing faces, called laser faces, each having dimensions $e_L \times w_L$, $w_L$ being called transverse dimension, and at least one emission module performing transverse pumping of the laser medium;
- the laser cavity is configured such that a horizontal dimension of the laser beam $w_a$ and a vertical dimension $w_b$ on each laser face is less than, respectively, half the transverse dimension of the laser face and half the horizontal dimension of the laser face, such that $w_b \leq w_L/2$ in the horizontal plane and $w_a \leq e_L/2$ in the vertical plane;
- the laser cavity is configured such that the propagation direction of the laser beam in the laser medium is parallel to the concentrator and such that the laser beam propagates below the concentrator, said width $w_c$ of the concentrator being equal to a length $L_L$ of the laser medium such that the laser beam is amplified over all of its propagation in the laser medium;
- the laser system comprises a first and a second coupling prism coupled respectively to a laser face, said prisms being configured to deflect said laser beam such that it is guided by total internal reflection in said laser medium onto the receiving face and a face opposite said receiving face, the cavity being designed such that a vertical dimension of the laser beam $w_a$ is such that $w_a \leq e_L \sin \theta_v$, where $\theta_v$ is an angle of incidence of the laser beam on said receiving face;
- the laser system comprises a plurality of emission modules coupled to the receiving face of the laser medium;
- the plurality of emission modules coupled to the receiving face of the laser medium consists of a first and a second emission module arranged side-by-side and substantially parallel to one another, said system furthermore comprising an LED-cooling system arranged between the first and the second emission module, the laser beam propagating parallel to and below the concentrators of the first and the second emission module, such that the laser beam is amplified in a region pumped simultaneously by the first and the second emission module, the cooling system consisting of metal materials or high-optical-quality transparent materials;
- the laser system comprises:
- a first plurality of emission modules, parallel to one another and placed facing one another and coupled to a first receiving face of the laser medium, a second plurality of emission modules, parallel to one another and placed facing one another and coupled to a second receiving face of the laser medium, the modules of the first plurality and of the second plurality furthermore being substantially parallel to one another, the propagation direction of the laser beam being perpendicular to the emission modules, the modules of the first plurality and of the second plurality being arranged in a quincunx.

the laser cavity is designed such that the laser beam propagates in a plurality of different regions of the laser medium, a plurality of identical emission modules being arranged above each region;

the laser system comprises:

a first and a second prism coupled respectively to a laser face, said prisms being designed to deflect said laser beam such that it is guided by total internal reflection in said laser medium onto two faces, called edges, of dimensions $e_L \times L_L$;

a first set of preferably identical emission modules coupled to the receiving face of the laser medium; a second set of emission modules arranged on the laser medium in the horizontal plane and coupled to said edges, so as to perform coplanar pumping of the laser medium, a horizontal dimension of the laser beam being such that $w_b \leq w_l \sin \theta_h$, where $\theta_h$ is an angle of incidence of the beam incident on said laser edges;

the emission modules of the second set being placed on said edges in a manner corresponding to regions of reflection of the laser beam guided in said laser medium;

the laser amplifier comprises the laser pumping assembly according to the invention, at least one emission module performing transverse pumping of the laser medium, a laser beam being incident on said laser amplifier and propagating in said laser medium in a propagation direction, passing through two opposing faces, called laser faces, each having dimensions $e_L \times w_L$.

BRIEF DESCRIPTION OF THE DRAWINGS

Other features, details and advantages of the invention will become apparent upon reading the description, given with reference to the appended drawings, which are given by way of example and in which, respectively.

The elements are not to scale in the figures unless indicated otherwise.

DETAILED DESCRIPTION

Figure 3A:
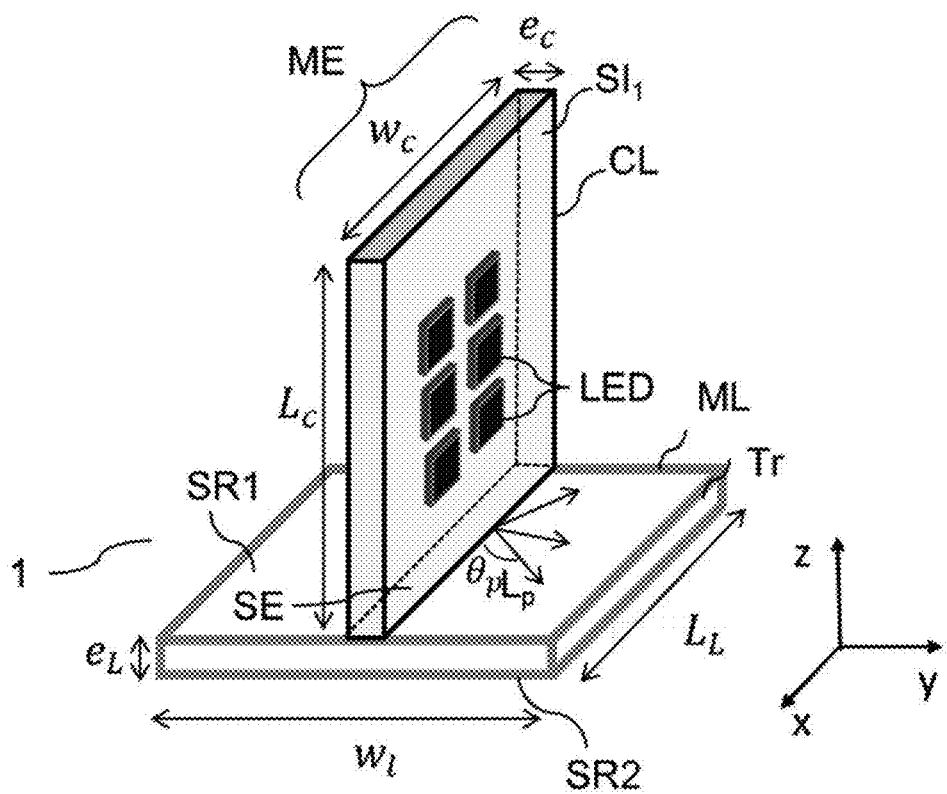
FIG. 3A shows a schematic view of the laser pumping assembly according to the invention.

FIG. 3A shows a schematic view of a laser pumping assembly 1 according to the invention. The laser pumping assembly comprises a parallelepipedal solid laser medium ML having the shape of a plate in a horizontal plane xy. The laser medium has an absorption spectral band and an associated absorption coefficient $\alpha$. Preferably, the absorption spectral band is in the visible or the near infrared (between 350 nm and 950 nm).

Figure 1A:
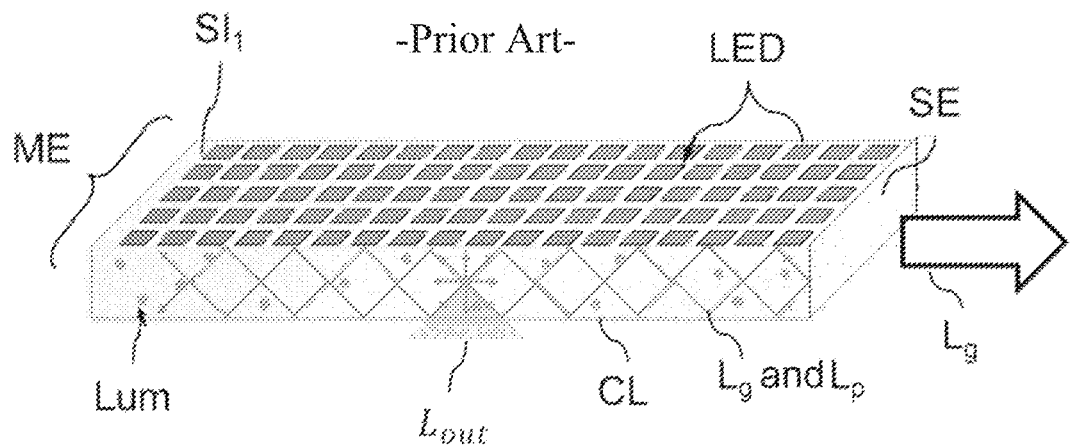
FIG. 1A.
Figure 1B:
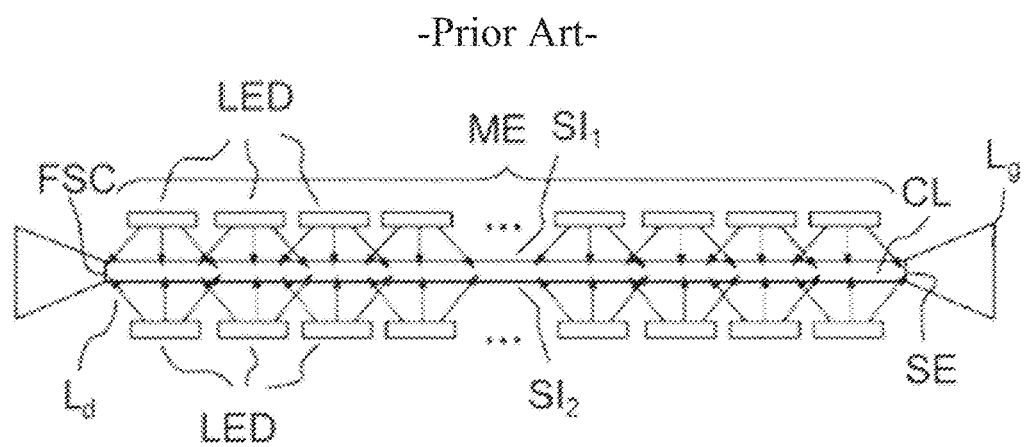
FIG. 1B show a schematic view of one example of an emission module known from the prior art.

The laser assembly additionally comprises at least one light emission module ME intended to pump the laser medium ML, identical to the one illustrated in FIGS. 1A and 1B. This emission module comprises a plurality of light-emitting diodes LED configured to emit electroluminescent radiation $L_d$ at a wavelength $\lambda_d$.

The emission module furthermore comprises a fluorescent parallelepipedal crystal called a concentrator CL, having the shape of a plate of thickness $e_c$, of width $w_c$ and of length $L_c$.

The concentrator CL has at least one illumination face $SI_1$, $SI_2$ illuminated by the electroluminescent radiation $L_d$ from the LEDs. The LEDs are arranged so as to form a matrix and so as to optimize the ratio between the total emission surface area of the LED matrix and each illumination face SI1, SI2 of the fluorescent crystal CL.

The concentrator is configured to absorb the electroluminescent radiation La emitted by the LEDs and to emit fluorescence radiation in a spectral range exhibiting an overlap with the absorption spectral band of the laser medium. As explained above, the luminous flux emitted by the LEDs passing through the illumination face is absorbed by the luminophores Lum of the fluorescent crystal. These luminophores are distributed throughout the volume of the crystal and de-excite by isotropically emitting fluorescence radiation within the fluorescence crystal.

Figure 3B:
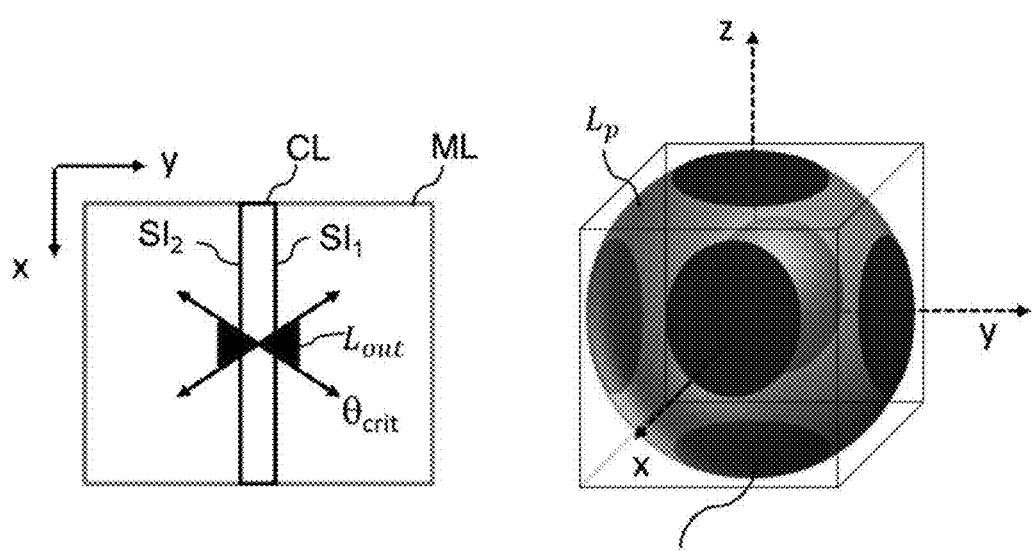
FIG. 3B shows a schematic depiction of guided rays in the concentrator.

What is referred to as a trapped portion $L_p$ of this fluorescence radiation is trapped by TIR in the concentrator. A second portion consists of light that exits the concentrator, with a part guided toward the edges $L_g$ and a part that exits directly $L_{out}$. FIG. 3B shows an illustration of rays trapped in the concentrator. On the left is a depiction of the concentrator in a plan view (plane xy) with the schematic depiction of the escape cone of the unguided rays via the illumination faces $SI_1$ and $SI_2$. On the right is a depiction of the angular diagram of the rays emitted by the concentrator. The dark caps represent the angles corresponding to the untrapped rays (guided and unguided) and the light areas represent the angles corresponding to the trapped rays. In this depiction, given by way of example, the medium chosen as concentrator crystal CL is a Ce:YAG crystal with a critical angle of 33° (index $n_2=1.84$).

The percentage of radiation trapped by TIR with respect to the untrapped radiation is set by the index of the crystal and that of the ambient medium by Snell-Descartes law. For example, in a medium of index 1.84 such as YAG in air, the critical angle for the exit of the rays is 33°, as illustrated in FIG. 3B. 48% of the rays exit via the 6 escape cones through the 6 faces ($L_{out}$ and $L_g$) and 52% of the rays remain trapped within the structure ($L_p$).

Critically, the inventors have realized that, after ray tracing simulations, the fluorescence radiation trapped by TIR in the concentrator $L_p$ remains trapped for as long as the 6 planes that form the outer surfaces of the structure remain identical, regardless of the shape of the structure. Thus, a structure of constant index, having 6 planes that are parallel in pairs, will end up being filled uniformly with trapped light.

To comply with this configuration, one necessary condition is that the concentrator CL of the emission module ME is arranged perpendicular to the laser medium ML, that is to say that the illumination faces $SI_1$ $SI_2$ are perpendicular to a receiving face SR, SR1, SR2 of the laser medium ML.

The concentrator CL is coupled, via an emitting face SE, to a receiving face SR1, SR2 of the laser medium. The contact between the emitting face SE and the receiving face SR is suitable for the rays trapped in the concentrator CL to be able to pass into the laser medium ML. The trapped rays all pass into the laser medium ML if the concentrator CL and the laser medium ML are in optical contact and if the index of the laser medium ML is greater than or equal to the index of the concentrator CL. Some of the trapped rays pass into the laser medium ME if an adhesive of an index different from the indices of the laser medium ML and of the concentrator CL is used between the laser medium ML and the concentrator CL.

If the edges Tr of the laser medium ML are parallel to the edges Tr of the concentrator CL, then all of the rays trapped in the concentrator CL that pass into the laser medium ML are also trapped in the laser medium ML. However, this condition is not necessarily useful for ensuring good confinement of the pumping light. Indeed, due to absorption in the laser medium ML, the pump light has little chance of reaching the edges Tr before being absorbed if the transverse dimensions of the laser plate ($w_L$ and $L_L$) are greater than $L_{abs}$. The condition of perpendicularity of the concentrator CL with respect to ML is thus enough for the pump rays to be confined within the laser medium ML: by TIR trapping between the faces SR1, SR2 and by absorption in the plane of the laser medium ML: The pump radiation trapped by TIR in the laser medium propagates therein until being absorbed. This point is very important since it means that the invention considers all possible orientations of the concentrator CL on the laser medium ML as long as the planes $SI_1$ $SI_2$ remain perpendicular to the plane SR.

The inventors have taken advantage of this concept of confining rays trapped in the laser medium ML in order to greatly increase the pump power volume density in the laser medium while at the same time greatly reducing the thickness of the laser medium.

The invention thus makes it possible to choose the thickness of the laser medium such that $e_L \ll L_{abs}$, where $L_{abs}=1/\alpha$ is the absorption length of the laser medium. This has the effect of decoupling the absorption in the laser medium ML from its dimension perpendicular to SE ($e_L$). More precisely, the inventors determined, after numerous simulations and experiments, that, when the thickness $e_l$ of the laser medium is such that $e_L \leq L_{abs}/5$, preferably $e_L \leq L_{abs}/10$, the pump power volume density is high enough. The validity of this condition will be illustrated by examples in FIGS. 6B to 14. Here, $\alpha$ is an averaged absorption coefficient taking into account the overlap between the absorption spectral band of the laser medium ML and the emission band of the concentrator CL.

Figure 2A:
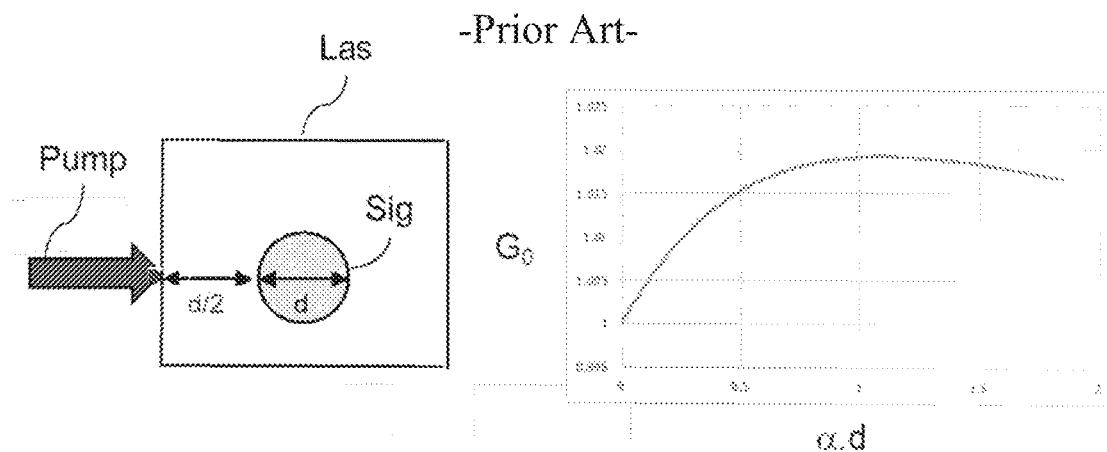
FIG. 2A shows a schematic view of transverse pumping of a laser medium known from the prior art.

The approach of reducing the thickness of the laser medium until making it much lower than the absorption length is particularly counter-intuitive. Indeed, in the case of conventional pumping of the receiving face SR of the laser medium using flash lamps or using laser diodes (as in FIG. 2A), there is the problem of low absorption of the pump radiation when reducing the thickness of the laser medium. If consideration is given to a laser plate of thickness $e_L \ll L_{abs}$, as pump light propagates in air before reaching the laser plate, it cannot be trapped in the laser plate. The rays will thus make do with passing through the laser plate through the thickness thereof without being absorbed to a significant extent.

"T-shaped" pumping device is the name given here to the configuration of the laser pumping assembly (FIG. 3A) of the invention that consists in transversely pumping a laser plate ML of thickness $e_L$ less than the absorption length $L_{abs}$ divided by 5, preferably divided by 10, using a concentrator arranged perpendicular and coupled to the major face (receiving face) of the laser medium. The increase in the pump power volume density is obtained by reducing the thickness of the laser plate ML, imposing multiple reflections of the pump light in the laser medium ML, mostly between SR1 and SR2.

Figure 3C:
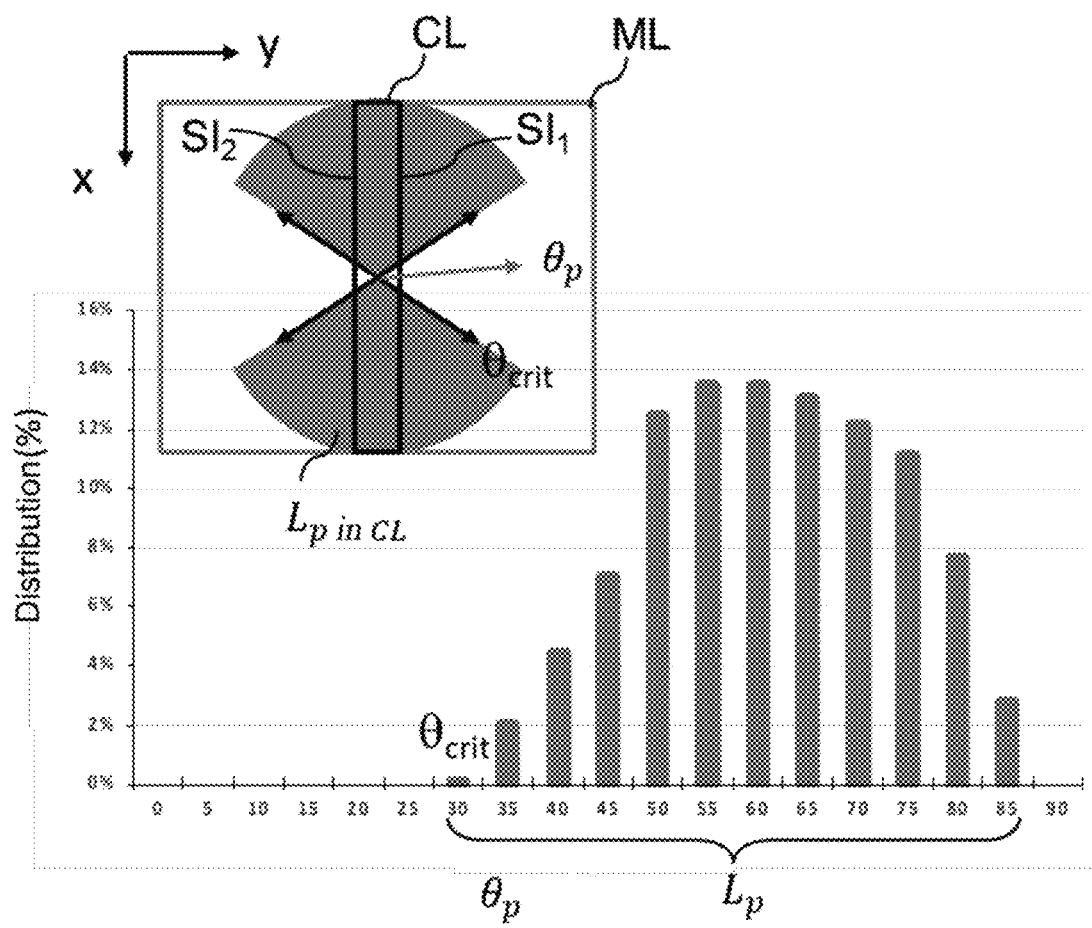
FIG. 3C shows a depiction of trapped rays coupled into the laser medium as a function of the angle of incidence.

FIG. 3C illustrates the angular distribution of the rays of the portion of the trapped fluorescence radiation $L_p$ passing through the laser medium. Here, the angle of the rays $\theta_p$ is referenced with respect to the normal to the surface $SI_1$. FIG. 3C additionally comprises a schematic depiction of the trapped rays of the portion of the fluorescence radiation (gray area) in the concentrator, in a plan view (horizontal plane xy). In the example of FIG. 3C, given without limitation, the laser medium is a plate made of alexandrite crystal ($Cr^{3+}$:$BeAl_2O_4$) of thickness $e_L=1$ mm, of length $L_L=50$ mm and of width $w_L=10$ mm, with doping of 0.22% corresponding to an absorption length of 2 $cm^{-1}$. The index of the laser plate is 1.76, this corresponding to an angle $\theta_{crit}=34.6°$, beyond which angle the rays are reflected by TIR onto the faces. This laser plate is pumped by a Ce:YAG concentrator according to the configuration of FIG. 3A with a "T-shaped" configuration. It may be seen in FIG. 3C that there are virtually no rays between the incidences 0° and $\theta_{crit}$. Indeed, these rays, the origin of which is the isotropic emission of Ce ions (the luminophores of the concentrator crystal), are not trapped in the concentrator and have already exited via the two major planes SI1, SI2 of the concentrator (see $L_{out}$ in FIG. 3B). The rays propagating in the laser plate thus have very large angles. Due to this, the pump illumination underneath the concentrator decreases very strongly when moving laterally away from the center of the concentrator due to the projection of the rays, which are greatly inclined in the vertical plane, as will be shown in FIG. 6B.

Moreover, the guided rays $L_g$ and unguided rays $L_{out}$ passing through the emitting face SE pass through the laser medium ML with angles of incidence of between 0° and $\theta_{crit}$ and pass through only the laser plate. Since this has a thickness ($e_L=1$ mm) much smaller than the absorption length ($L_{abs}=5$ mm), the contribution of these rays to absorption will be very small.

The efficiency $\eta_{opt}$ of the concentrator is defined as the ratio between the luminous power of the fluorescence radiation transmitted in the laser medium ML and the total power emitted by fluorescence. This efficiency depends on numerous parameters known to those skilled in the art: photoluminescence efficiency, total internal reflection efficiency, absorption capacity of the fluorescent crystal, propagation losses in the fluorescence crystal, losses at the interface between the emitting face SE and the receiving face SR.

In order to maximize the flux coupled into the laser medium ML, it is advantageous to limit the jump in index between the concentrator and the laser medium. Therefore, according to one embodiment, the concentrator and the laser medium are made of an identical material or a material of the same index and the same physical nature so as to be able to achieve molecular adhesive bonding (for example Ce:YAG for the concentrator and Nd:YAG for the laser medium).

Figure 4:
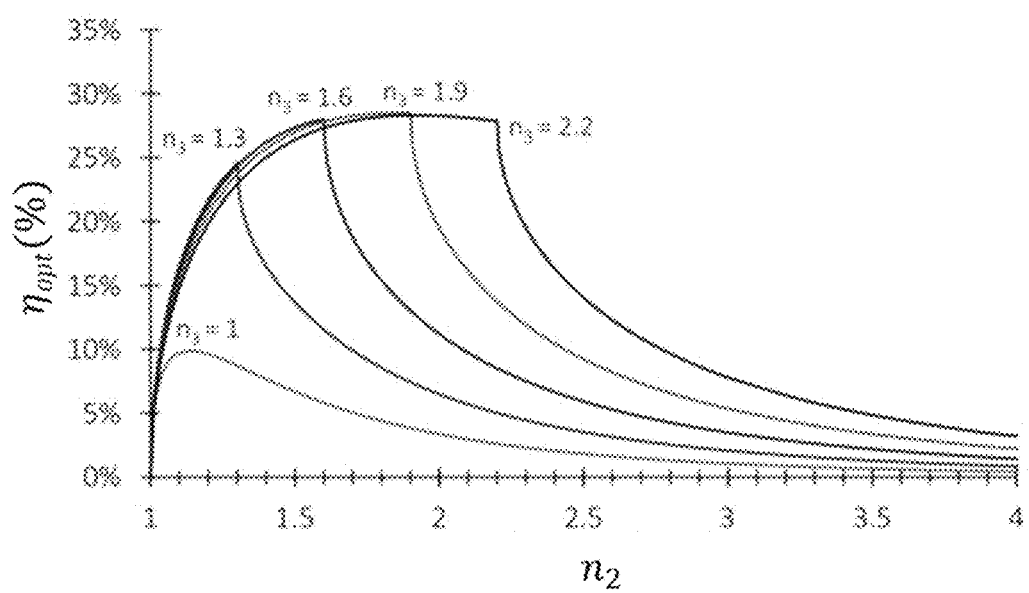
FIG. 4 shows a depiction of the optical efficiency of the concentrator as a function of the index of the concentrator ($n_2$) and of the index of the exit medium ($n_3$)

As an alternative, according to another embodiment, the concentrator is adhesively bonded to the laser medium by an adhesive that makes it possible to limit the jump in index in comparison with a transition in air. FIG. 4 shows the optical efficiency $\eta_{opt}$ of the concentrator as a function of the index of the concentrator ($n_2$) and of the index ($n_3$) of the medium in which the exit face SE is located, that is to say the adhesive. When the interface between the concentrator and the laser plate is air, only the rays not trapped in the concentrator exit and are able to be coupled into the laser plate. In order to improve the efficiency of the concentrator, it is advantageous to have an index of the adhesive close to that of the concentrator.

However, it is noted that the efficiency tends toward a plateau relatively quickly. As an alternative, according to one embodiment, the adhesive is designed so as to have an intermediate index. For example, in the case of a Ce:YAG concentrator of index $n_2=1.84$ and a laser medium of index $n_L=1.7$, an adhesive of index $n_3=1.5$ is chosen. This embodiment makes it possible to couple around 2.5 times more light into the laser medium ML than if there were an air gap between ME and ML.

The laser system of the invention thus makes it possible to achieve high amplification gains while at the same time inventively reducing the thickness of the laser medium pumped transversely by a concentrator, thus increasing the pump power volume density, by taking advantage of the TIR guidance of the pump radiation in the laser medium.

Figure 2B:
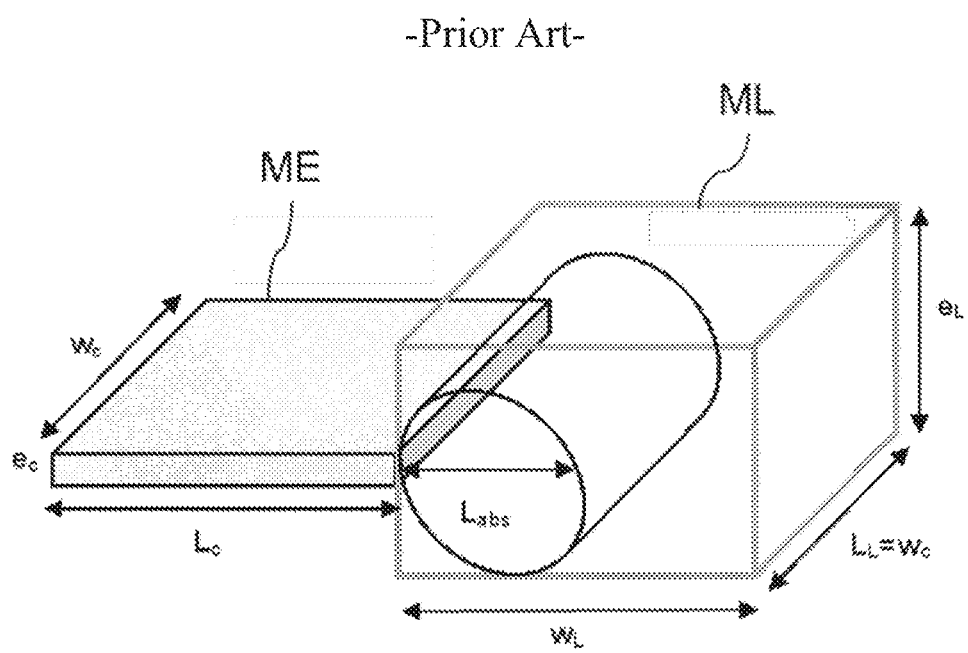
FIG. 2B shows a schematic view of transverse pumping with the aid of an emission module using a concentrator, known from the prior art.

According to one embodiment, a ratio between the surface area of the receiving face SR of the laser medium and a surface area of the emitting face of the concentrator SE is greater than 5. This makes it possible to confine the pump rays in the plane xy of the laser plate by absorption. This also makes it possible to have a large horizontal dimension (in the direction y) of the laser beam. Since the vertical dimension of the laser beam is set by the thickness $e_L$ of the laser plate, the laser beam will tend to be elliptical. This property makes it possible to work with beams having a large surface area while at the same time ensuring very good confinement of the pump radiation in the laser beam, in contrast to the conventional configuration described in FIG. 2B.

According to one embodiment, a ratio between a surface area of the illumination face of the concentrator SI and a surface area of the emitting face of the concentrator SE is greater than or equal to 100. This makes it possible to maximize the number of LEDs placed on the illumination faces SI and therefore to maximize the pump power.

The laser medium and the concentrator are made from materials known to those skilled in the art, for example such as those cited in document FR 3045965 B1. Without being exhaustive, the following may be cited as material for the laser medium:alexandrite ($Cr^{3+}$:$BeAl_2O_4$), Nd:YVO$_4$, Cr:LiSAF, Ti:Sa, Nd:YAG, Er:Yb:glass, Er:Yb:YAG, Tm:YAG, Cr:ZnSe, etc. Without being exhaustive, the following may be cited as material for the concentrator: any scintillator crystal material (Ce:YAG, Ce:LuAG, Ce:LiCAF, Ce:YLF, Eu:CsCaI, Na:CsI, etc.) or laser material cited above.

This laser pumping assembly is a basic block for any laser system. It may be inserted between mirrors of a resonant cavity in order to obtain a laser oscillator. It may also be used directly to amplify a laser beam making one or more passes in the amplifier laser medium: amplifier with multiple geometric passes, amplifier with multiple polarization passes (said to be regenerative). In both cases, oscillator or amplifier, the operating mode may be continuous, quasi-continuous or pulsed, with pulses possibly ranging from a second to a femtosecond.

Figure 5:
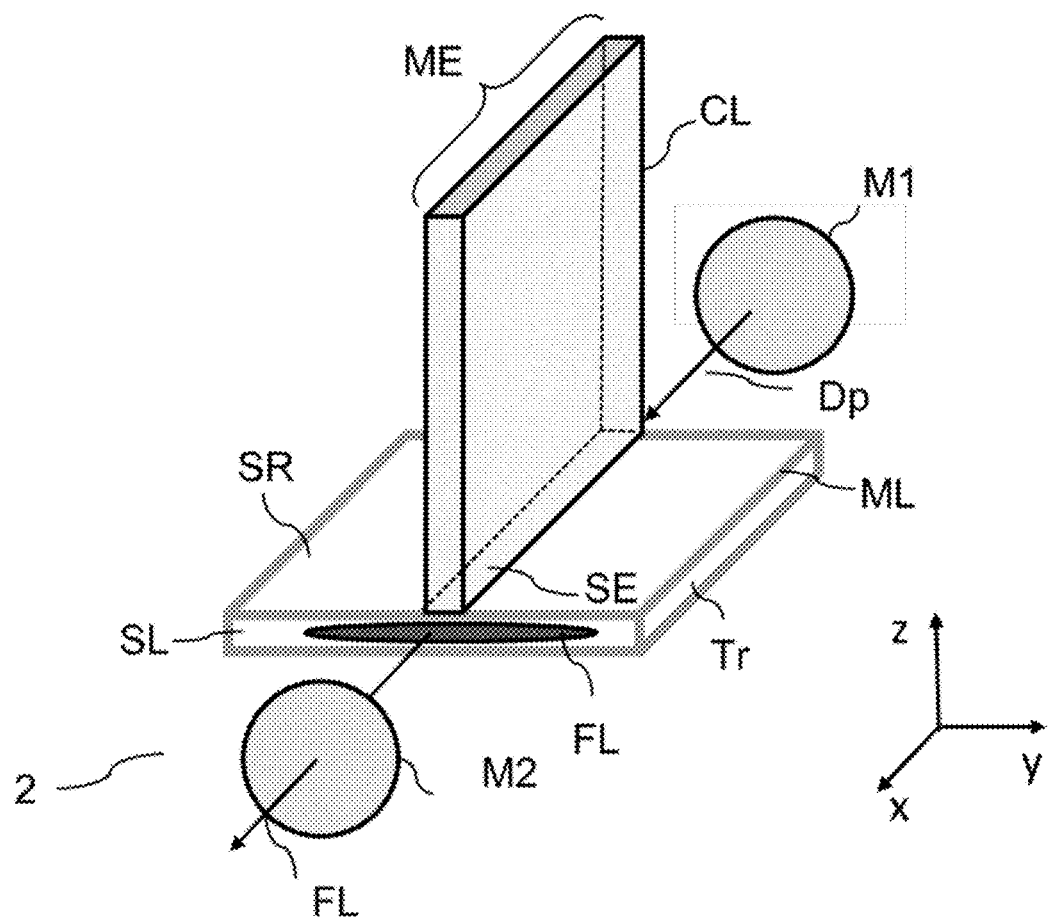
FIG. 5 shows a schematic view of a laser assembly according to the invention.

FIG. 5 shows a laser system 2 according to one embodiment of the invention comprising at least two cavity mirrors M1, M2 so as to form a laser cavity in which the laser assembly of FIG. 1 is arranged and in which a laser beam FL propagates. The laser beam propagates in the cavity and in the laser medium in a propagation direction Dp, passing through two opposing faces, called laser faces SL, located on the edges of the laser plate. These laser faces each have dimensions $e_L \times w_L$, $w_L$ being called transverse dimension (in the direction y) of the laser face here. In this embodiment, preferably, the propagation direction of the laser beam Dp in the laser medium is parallel to the plane of the concentrator, such that the laser beam propagates below the concentrator. Preferably, the width $w_c$ of the concentrator is equal to a length $L_L$ of the laser medium such that the laser beam is amplified throughout its propagation in the laser medium.

According to one embodiment, the horizontal dimension of the laser beam $w_b$ on each laser face SL is less than or equal to half the transverse dimension of the laser face, such that $w_b \leq w_L/2$. The vertical dimension of the laser beam $w_a$ on each laser face SL is less than or equal to half the vertical dimension (in the direction z) of the laser face, such that $w_a \leq e_L/2$. These conditions are necessary to avoid the diffraction of the laser beam FL via the edges of the laser plate ML.

Hereinafter, FIGS. 6 and 7 are designed to give an understanding of the relevance of the invention with respect to conventional configurations. FIGS. 8 to 14 show other arrangements for laser systems (laser oscillator or laser amplifiers) based on the invention from the perspective of achieving a higher beam energy.

Figure 6A:
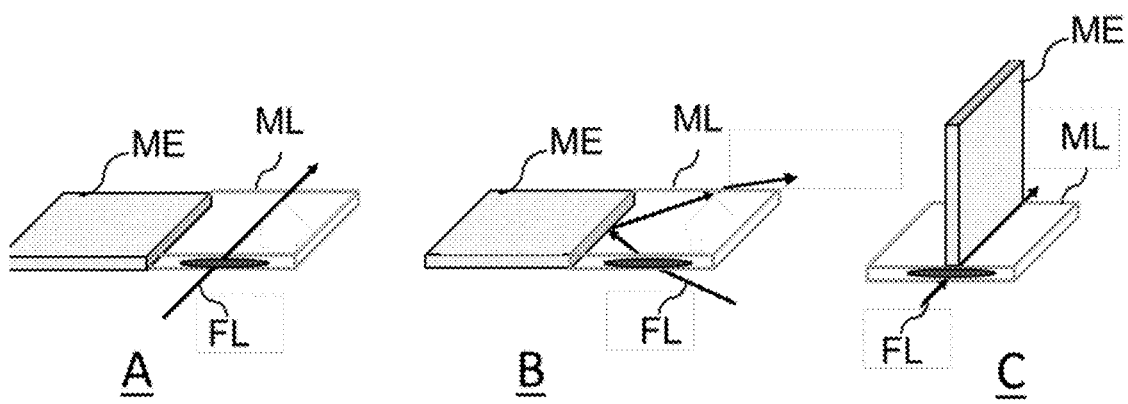
FIG. 6A shows a schematic depiction of three different concentrator and laser medium configurations, one of which being that of the invention.
Figure 6B:
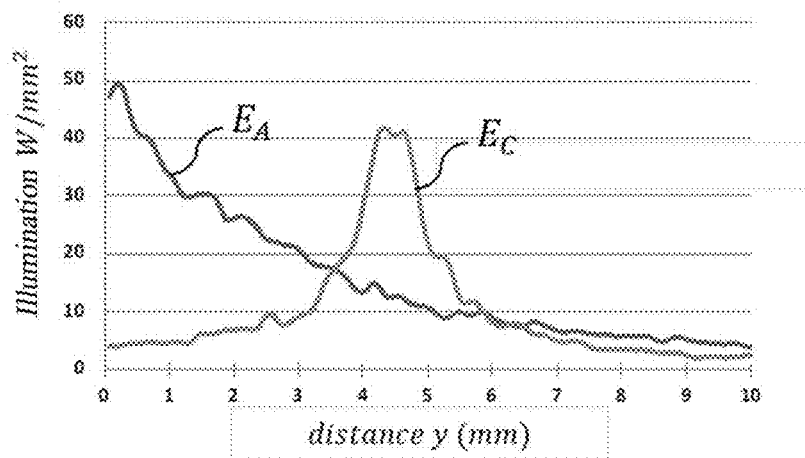
FIG. 6B shows a comparison of the illumination obtained in the laser medium for two of the different configurations: a coplanar pumping configuration ($E_A$) and a T-shaped pumping configuration ($E_c$) corresponding to the invention.
Figure 6C:
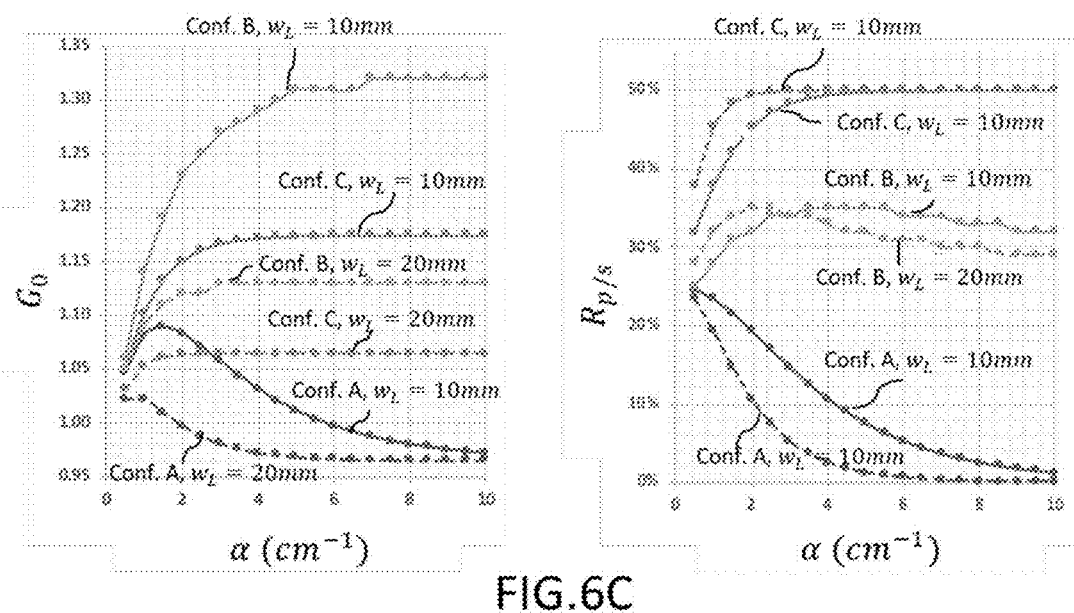
FIG. 6C shows a comparison of the gain and the pump-signal overlap of the three different configurations for two different laser medium widths $w_l$ in the plane of the laser plate.

FIGS. 6A-6C show a comparison of various arrangements of an emission module ME on laser plates ML, illustrating the superiority of the arrangement of the invention. Configuration A is that of coplanar pumping, that is to say a concentrator coupled to an edge of the laser plate, and with a laser beam parallel to the emitting face of the concentrator. Configuration B corresponds to coplanar pumping with a laser beam with grazing incidence on the edge of the laser medium to which the concentrator is coupled. In configurations A and B, the laser medium is matched to the concentrator, that is to say that the thickness of the plate is equal to that of the concentrator and the length of the laser medium is equal to the width of the concentrator. Configuration C is that of one embodiment of the invention, that is to say that of T-shaped pumping on the center of a laser medium with a laser beam parallel to the plane of the concentrator.

It should be noted that configuration B with grazing incidence is possible only if there is a significant difference in index between the concentrator and the laser medium allowing total internal reflection. In the case of adhesive bonding between the two media with an adhesive of index n=1.5 and a laser medium of index n=1.7 (for alexandrite), the angle of total internal reflection is 62°. The laser beam should therefore have an incidence greater than this angle at the concentrator.

All of the configurations require the use of a laser beam with a cross section suited to the geometry of the laser "plate". Given the limits imposed by diffraction, the size of the beam should be limited to half the size of the laser crystal, in the plane transverse to the axis of propagation of the laser: this then gives a laser beam of dimension $w_a \times w_b$, where $w_a = e_L/2$ and $w_b = w_L/2$ in the directions z and y, respectively. The calculations in FIGS. 6B and 6C are, by way of non-limiting example, performed on an alexandrite laser medium of thickness $e_L=1$ mm, of length $L_L=50$ mm and of width $w_L=10$ mm having doping of 0.22% $Cr^{3+}$ ions. In order to simplify the calculations, it is assumed that the signal beam has a rectangular cross section (this is elliptical in reality). The concentrator is made of Ce:YAG. The maximum absorption coefficient of alexandrite for the spectrum of a Ce:YAG concentrator (550-650 nm) is 2 $cm^{-1}$. In the three configurations, the concentrator emits one and the same pump power.

FIG. 6B makes it possible to compare the illumination of the pump radiation obtained in the laser plate for the conventional configurations A, B (curve $E_A$) and for the T-shaped pumping configuration C (curve $E_C$), with the aid of simulations performed by ray tracing software. It is interesting to note that the distribution of the pump illumination is highly different. In the case of coplanar pumping (configuration A), the pump illumination decreases with a value of 3 $cm^{-1}$, in the case of the pumping according to the invention (configuration C), the decrease is 9 $cm^{-1}$. It should first of all be noted that these two values are different from the absorption coefficient of the laser material (2 $cm^{-1}$). This effect stems from the fact that the pump rays are not all in just one direction: numerous directions are possible due to the isotropic emission in the concentrator (spontaneous emission). The difference between the two configurations may be explained by the nature of the pump rays that are absorbed in the plate. In the coplanar case, the absorbed rays are distributed from the zero incidence (corresponding to the propagation in the plane of the plates and on an axis perpendicular to the exit face). In the case of T-shaped pumping, the rays absorbed in the laser plate correspond only to the trapped rays, as illustrated in FIG. 3C.

The graph on the left in FIG. 6C shows the averaged gain $G_0$ over the cross section of the laser beam, while the graph on the right shows the overlap $R_{p/s}$ between the laser beam and the pump radiation. These calculations are performed for each configuration and for two different laser face widths, $w_L=10$ mm and $w_L=20$ mm. Here, the gain calculation takes into account passive losses of the alexandrite crystal so as to approximate a real situation (loss coefficient estimated at $7.10^{-3}$ $cm^{-1}$). The variable parameter chosen on the abscissa is the absorption coefficient of the crystal, which is linked to the doping of the laser medium in $Cr^{3+}$ ions and which directly influences the gain. The cross section of the beam is set here to half the dimensions of the laser plate: $w_a=500$ µm and $w_b=5$ mm.

The graph on the left in FIG. 6C shows that the maximum gain in configuration A is the smallest. It corresponds to a value a close to 2 $cm^{-1}$, this corresponding to an absorption length of 5 mm, as provided by the calculations in FIG. 2A and taking $d=w_b$. The greater gain in configuration B in comparison with configuration C may be explained by the poor overlap between the pump volume and the laser beam in the case of the T-shaped pumping presented here. Indeed, the laser beam has a greater spatial extent ($w_b=5$ mm) than the gain area (see FIG. 6B). On the other hand, in configuration B, the whole beam will be reflected by TIR from the edge in contact with the emitting surface SE of the concentrator, thus benefiting from the maximum gain over the entire cross section of the beam and therefore from good overlap between the pumped area and the laser beam.

With regard to the overlap $R_{p/s}$ between the pump beam and the laser beam (graph on the right in FIG. 6C), the T-shaped pumping (configuration C) is far better than the other configurations. Indeed, in the configuration of the invention, the entire pumped area located underneath the concentrator may be used by the laser beam. The overlap tends toward a value of 50%. This upper limit is linked to the fact that the vertical dimension of the laser beam cannot be greater than half the thickness of the laser plate ($w_a=e_L/2$), given the limit imposed by diffraction.

T-shaped pumping may thus be seen as a "middle ground" in terms of gain between a coplanar pumping configuration with a beam parallel to SE (configuration A) and a coplanar pumping configuration with grazing incidence (configuration B) that requires controlling the angle on the laser beam. In addition, T-shaped pumping has a very clear advantage in terms of overlap, which is a critical parameter for allowing amplification with good efficiency and thus obtaining a laser amplifier that generates or amplifies a high-energy laser beam FL.

The energy increase perspective requires increasing the surface area of the beam so as not to run into the optical damage threshold for the entrance face ($e_L$ $w_L$) of the laser medium. The graphs in FIG. 6C show how these three pumping configurations react to the increase in the surface area of the laser plate. Two configurations where the width of the laser plate is doubled from $w_L$=10 mm to $w_L$=20 mm are compared here. In both cases, the concentrator remains the same, with the same pumping power and the same laser plate thickness. The laser beam is matched to the laser plate: $w_b$=5 mm in the first case and $w_b$=10 mm in the second case, $w_a$ remaining unchanged.

The effect of increasing the width of the laser plate is insignificant on the overlap (on the right in FIG. 6C). By contrast, it is highly detrimental to the gain (on the left in FIG. 6C), due to the drop in pump illumination caused by doubling the pumped volume. From the perspective of increasing the energy of the laser beam (and therefore its surface area when it passes through the laser medium to take account of the damage thresholds), the modularity of T-shaped pumping is highly advantageous, as illustrated in FIGS. 8 to 14.

Figure 7A:
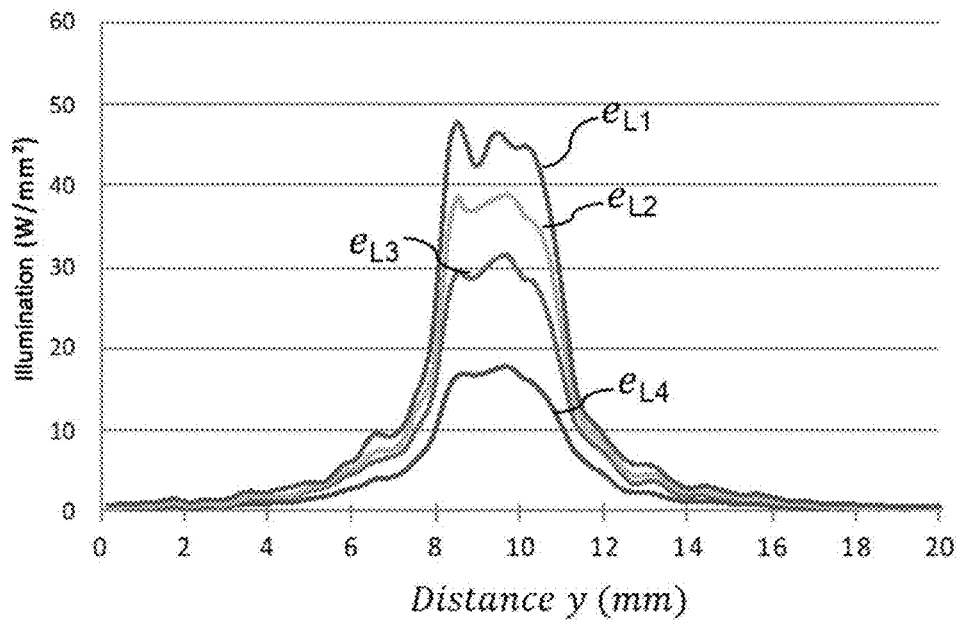
FIG. 7A shows the illumination obtained in the laser medium in the pumping assembly of the invention as a function of the thickness of the laser medium, $e_{L1}$=0.5 mm, $e_{L2}$=0.7 mm, $e_{L3}$=1 mm, $e_{L4}$=2 mm. The thickness of the concentrator is set at $e_c$=3 mm.
Figure 7B:
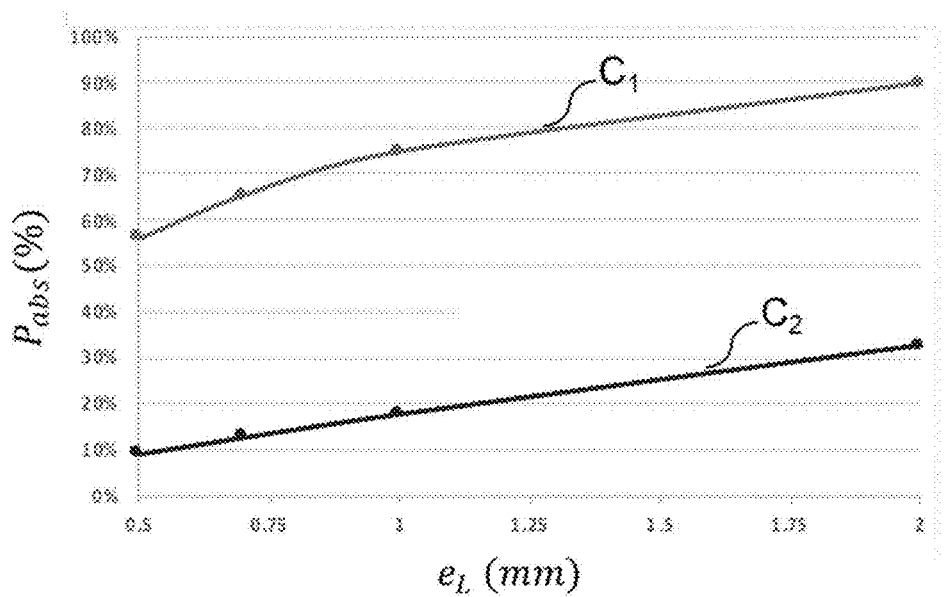
FIG. 7B shows a comparison of the pump power absorbed in the laser medium in the pumping assembly of the invention ($C_1$) and with a collimated pump beam without trapped rays ($C_2$), as a function of the thickness of the laser medium.
Figure 7C:
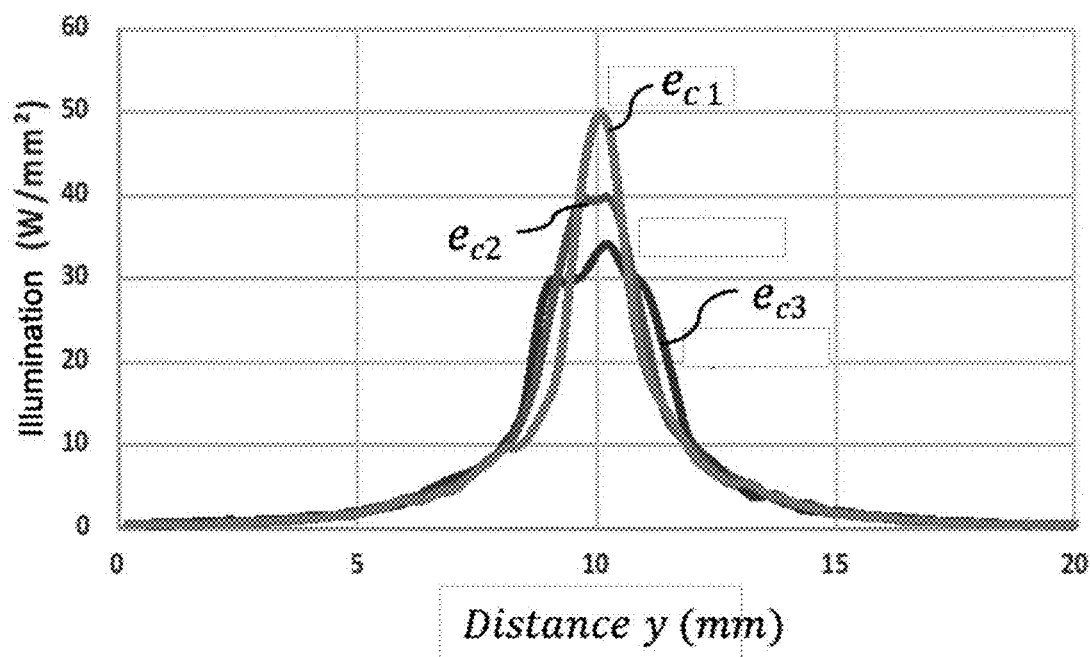
FIG. 7C shows the illumination obtained in the laser medium in the pumping assembly of the invention as a function of the thickness of the concentrator, $e_{c1}$=1 mm, $e_{c2}$=2 mm, $e_{c3}$=3 mm. The thickness of the laser plate is set at $e_L$=1 mm.
Figure 7D:
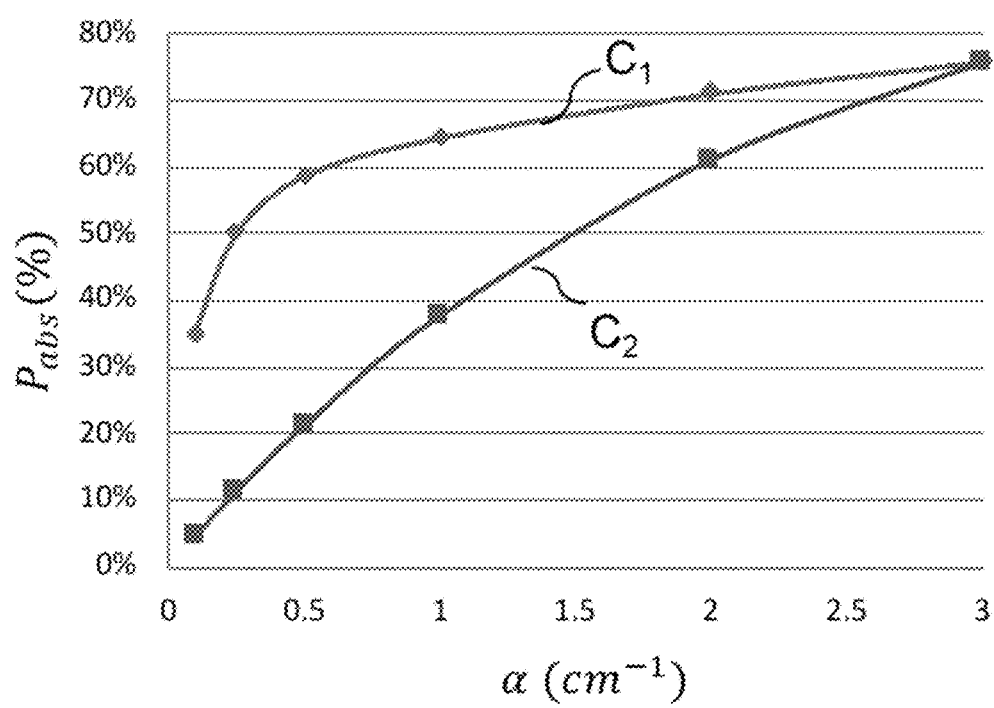
FIG. 7D shows a comparison of the pump power absorbed in the laser medium in the pumping assembly of the invention ($C_1$) and with a collimated pump beam without trapped rays ($C_2$), as a function of the absorption coefficient of the laser medium.

FIGS. 7A to 7D illustrate the modularity of the performance of the laser system shown in FIG. 5 as a function of various parameters of the laser plate ML: the thickness of the laser plate ML (FIGS. 7A and 7B), the thickness of the concentrator CL (FIG. 7C), and the absorption coefficient of the laser plate ML (FIG. 7D). In the embodiment of these figures, the laser medium is identical to that of the embodiment of FIGS. 6A-6C, except that it currently has a width $w_L$=20 mm and a length $L_L$=50 mm, the concentrator having a width $w_c$=$L_L$. These values are chosen by way of example and are not limiting.

FIG. 7A shows the evolution of the illumination underneath the concentrator in the transverse direction (along y) as a function of the thickness $e_L$ of the laser plate. The curves eI1 to eI4 correspond to a thickness of 0.5 mm, 0.7 mm, 1 mm, 2 mm, respectively. It is observed that, the smaller the thickness of the plate, the greater the illumination: this is due to the multiple reflections from the faces SR, which confine the pump rays more the closer the faces are to one another. It is noted that, for a plate thickness changing from $e_L$=2 mm to $e_L$=1 mm=$L_{abs}$/5, the illumination underneath the concentrator has almost doubled, illustrating in concrete terms the major advantage of T-shaped pumping. Preferably, in order to obtain maximum illumination underneath the concentrator (approximately 45 W/mm²), the thickness of the laser plate is less than or equal to $L_{abs}$/10, that is to say $e_L$=0.5 mm here. In addition, it is interesting to note that the flanks of the illuminated area are steeper for lower plate thicknesses: this may be explained by the proximity of the exit face of the concentrator to the center of the laser plate. The pump rays have less space to move away from the pumped area if the laser plate is thinner. In any case, the rays remain confined underneath the concentrator due to the high angles of the trapped rays (FIG. 3C).

FIG. 7B shows the evolution of the pump power absorbed in the laser plate $P_{abs}$ as a function of the thickness $e_L$ of the laser plate for the T-shaped configuration (curve C1) and for a conventional pumping configuration in which all of the rays of the concentrator simply pass through the laser plate (curve C2) without being trapped there. As expected, the absorption changes little in the T-shaped configuration due to the trapped rays (curve C1). By comparison, if the rays were only to pass through the plate (curve C2), the absorbed power would be far lower (from 3 to 6 times lower depending on the thickness of the plate). The absorbed power in the case of T-shaped pumping is far more tolerant to the variation in the thickness of the laser plate: the absorbed power is reduced by a factor of 1.6 if the plate changes from $e_L$=2 mm to $e_L$=0.5 mm for T-shaped pumping, while the absorbed power would be reduced by a factor of 3.5 for conventional pumping. This modularity of the invention for reducing the thickness of the laser medium in comparison with conventional pumping is particularly counter-intuitive.

FIG. 7C shows the evolution of the illumination seen by the laser beam FL as a function of distance, for 3 different values of the thickness $e_c$ of the concentrator CL. The curves ec1 to ec3 correspond to thicknesses of 1 mm, 2 mm and 3 mm, respectively. It is observed that, the more the thickness of the concentrator increases, the more the illumination drops. The illumination is relatively homogeneous over the entire extent of the concentrator.

It is interesting to note that the two thicknesses $e_L$ and $e_c$ are independent in the case of T-shaped pumping. They may be chosen with highly different values (for example a factor of 6 as shown in FIG. 7A, curve $e_{L1}$) while keeping an illumination value close to the maximum for a conventional coplanar pumping configuration (see FIG. 6B). This modularity without a loss of illumination is another advantage of the configuration of the laser assembly of the invention, which is not possible on coplanar pumping configurations in which the two plates have to have similar thicknesses so that the illumination is at a maximum.

FIG. 7D shows the evolution of the pump power absorbed in the laser plate as a function of the absorption coefficient for the T-shaped configuration (curve C1) and in a conventional pumping configuration in which all of the rays of the concentrator pass through the laser plate without being trapped (rays collimated for simplification). It is observed that the absorbed power varies far less quickly as a function of absorption in the case of the T-shaped configuration than in the case of a pump beam with untrapped rays. This effect is linked to the trapping of the pump rays within the laser plate. This implies a greater tolerance of the T-shaped configuration to the absorption of the laser medium than the conventional pumping configuration.

Figure 7E:
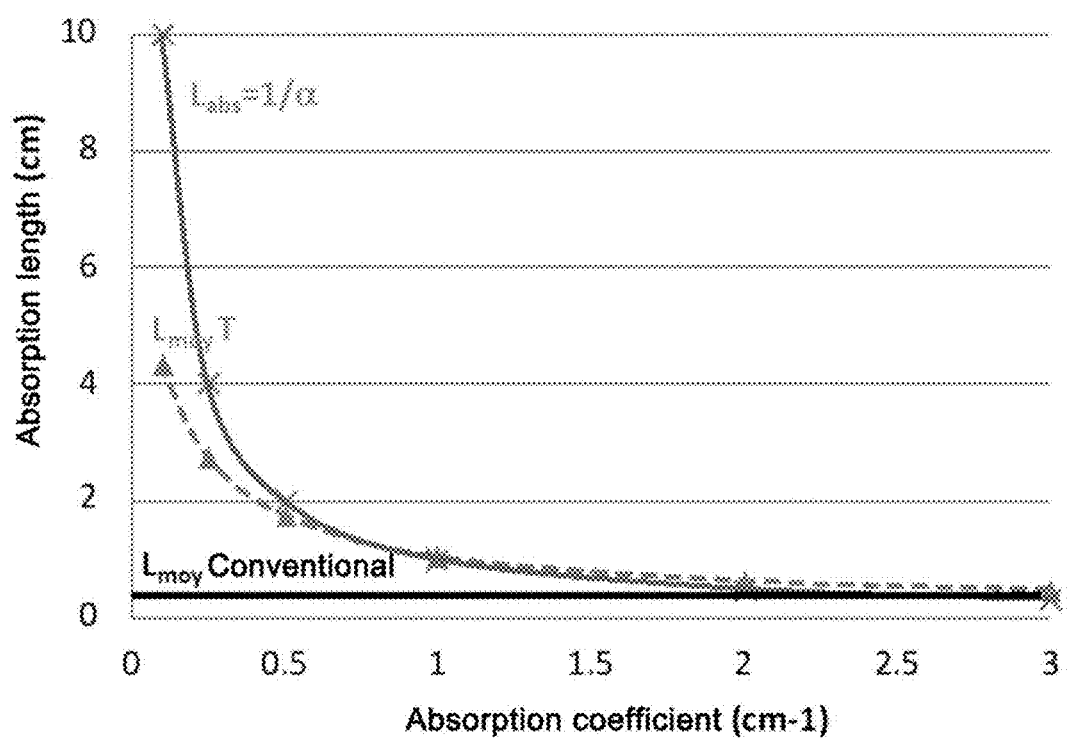
FIG. 7E shows a comparison of the average propagation length of a pump ray $L_{moy}$ in a T-shaped pumping configuration with trapped rays and in a conventional configuration without trapped rays. The absorption length $L_{abs}$ is given by way of comparison.

To understand this effect more precisely, $L_{moy}$ defines the average distance traveled by a pump ray in the laser plate. FIG. 7E compares this value in a T-shaped pumping configuration and in a conventional pumping configuration without trapped rays. In a conventional configuration, the average length corresponds to the propagation length in the laser medium. Since the rays simply pass through the plate the thickness $e_L$ of which is chosen here to be smaller than the absorption length $L_{abs}$: $L_{moy}$ is constant of the order of $e_L$. In the case of T-shaped pumping, the rays being trapped in the laser plate, the distance traveled would be infinite if the absorption were to be zero. Due to absorption, $L_{moy}$ is variable and adapts to $L_{abs}$ since the trapped rays are absorbed when they have traveled through the laser medium ML by a distance of the order of the absorption length $L_{abs}$. This point is highly important for adapting to the conventional doping of the laser materials. For example, the alexandrite crystals used in the examples of FIGS. 6A to 7D were doped to 0.22% (absorption coefficient of $\alpha$=2 cm$^{-1}$ for a Ce:YAG concentrator). However, the standard doping for the most commonly sold alexandrite crystals is 0.13% (absorption coefficient of $\alpha$=1.2 cm$^{-1}$ for a Ce:YAG concentrator). The T-shaped pumping device may easily be adapted to this doping while at the same time ensuring good absorption of the pump power (~65% for the T-shaped configuration against ~45% for the conventional configuration, see FIG. 7D), which will make it possible to reduce the cost of laser plates. Likewise, the T-shaped pumping may work with materials that it is not possible to dope strongly, such as for example titanium-doped sapphire or doped glasses.

Figure 8:
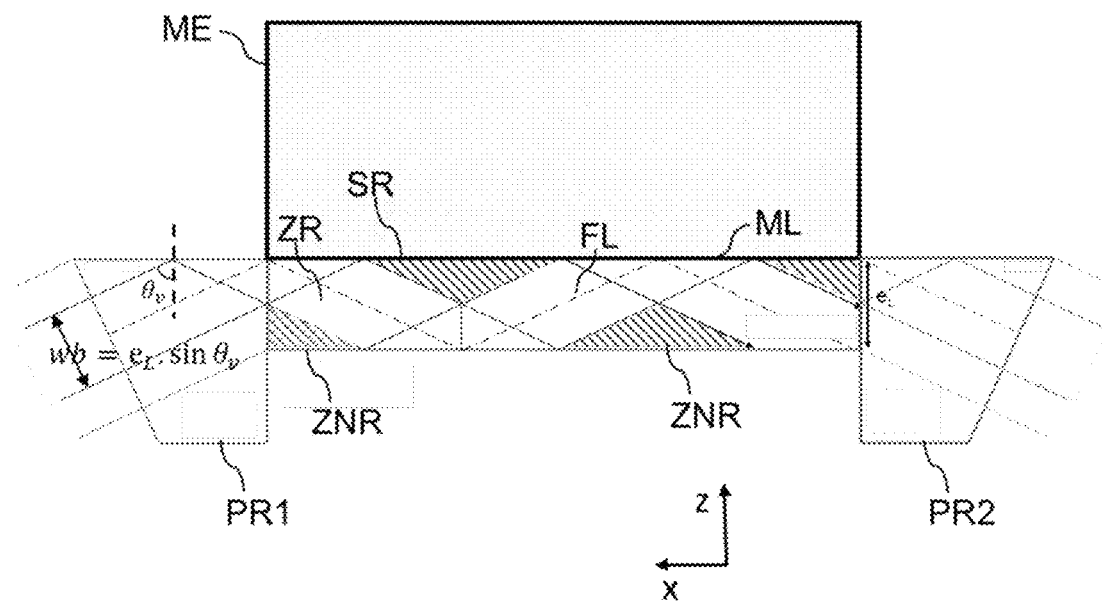
FIG. 8 shows a schematic view of a laser system according to the invention comprising two coupling prisms (PR1 and PR2)

FIG. 8 illustrates another embodiment of the invention, in which the laser system furthermore comprises a first and a second coupling prism PR1 and PR2 coupled respectively to a laser face. The two prisms are configured to deflect the laser beam FL such that it is guided by total internal reflection in the laser medium ML onto the receiving face SR and the face opposite to the receiving face with an angle of incidence $\theta_v$ on these two parallel faces. This embodiment makes it possible to exceed the overlap limit of 50% between the laser beam and the pump radiation as imposed by diffraction (see FIG. 6C) and makes it possible to achieve an overlap of 75% in the plane xz. This overlap is calculated by taking the ratio between the free surface area ZR that corresponds to the area of the path of the laser beam in the laser plate and the total surface area of the plate ZR+ZNR.

Another advantage of this embodiment is that it makes it possible to increase the size of the beam in the vertical plane by a factor of $2 \sin \theta_v$, thereby making it possible to increase the energy of the beam propagating in the laser medium without reaching the damage threshold on the entrance face of the laser medium. A dimension of the profile of the beam is then $w_a = e_L \sin \theta_v$, and not $w_a = e_L/2$ as before. In the case of an alexandrite plate ML adhesively bonded to ME by an adhesive of index 1.5, $\theta_v = 62°$, thereby bringing $w_a$ to a value of 0.88 $e_L$, almost doubled in comparison with a configuration with direct passage of the laser beam into the laser medium ML.

Figure 9:
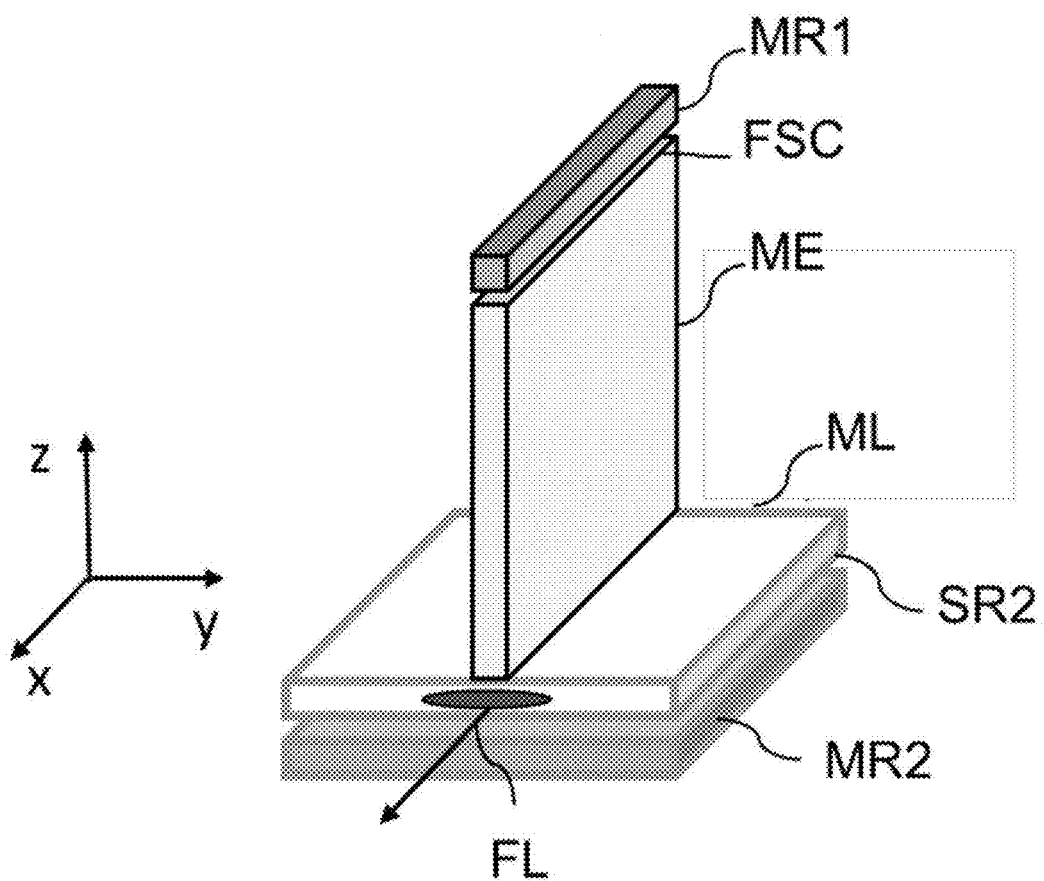
FIG. 9 shows a schematic view of a laser system according to the invention comprising two recycling mirrors (MR1 and MR2)

FIG. 9 illustrates another embodiment of the invention, in which the laser system furthermore comprises at least one first mirror, called recycling mirror MR1, coupled to the exit face of the concentrator FSC opposite said emitting face and/or a second mirror, called recycling mirror MR2, coupled to a face of the laser medium SR2 opposite the receiving face of the laser medium. The first mirror MR1 makes it possible to recycle the pump rays exiting via the exit face of the concentrator FSC into the laser plate. By way of example, for a Ce:YAG concentrator of length $L_c = 200$ mm, this mirror MR1 allows a gain by a factor of 1.5 on the illumination at the exit of the concentrator. The second recycling mirror MR2 makes it possible to redirect, into the laser plate, the untrapped pump rays exiting via the face SR2. By way of example, a mirror 2 on a system with $e_L = 1$ mm, $e_c = 1$ mm and an absorption of 2 cm$^{-1}$ makes it possible to change the illumination underneath the concentrator from 64 W/mm$^2$ to 73 W/mm$^2$ and change the absorption of the pump in the laser plate from 63% to 77%.

According to one variant of the embodiment of FIG. 9, the assembly additionally comprises the coupling prisms PR1 and PR2. In one example given without limitation, laser amplifiers capable of delivering beams with an energy of 100 mJ are presented below. The laser medium ML is a plate of $e_L = 500$ μm for a length of $L_L = 50$ mm with an absorption length associated with the concentrator of $L_{abs} = 10$ mm. With an angle of incidence $\theta_v = 65°$ on the major faces of the laser plate, the size of the beam in the vertical plane will be $e_L \sin(65°) = 450$ μm. A limit density of 3 J/cm$^2$ is set in order not to exceed the damage threshold. To comply with this limit energy density, an energy of 100 mJ on a rectangular beam of surface area $w_a \times w_b$ will involve using a beam size in the horizontal plane of $w_b = 7$ mm. This value makes it possible to set the width of the laser plate: $w_L = 2w_b = 14$ mm.

The fill level of the laser plate is defined by the ratio between the volume of the laser beam in the laser plate to the volume of the laser plate. Given the previous approaches, the fill level is $R_{plaque} = 0.5 * 0.75 = 0.38$, taking account of the dimension of the beam in the horizontal plane and its specific propagation in the vertical plane. This quantity is important from an energy increase perspective with beams with a large cross-sectional surface area: the larger the laser beam, the larger the laser plate will have to be. Since laser materials have a high cost, it is important to know how to fill the volume of the laser medium with the laser beam as best possible. It will be seen in the configurations of FIGS. 13 and 14 how to increase this fill level using the modularity of T-shaped pumping.

Given the horizontal size $w_b$ of the beam, it is necessary to choose a very thick concentrator ($e_c = 3$ mm) in order to avoid excessively localized gain along y, which could deform the laser beam. Adopting a thicker concentrator would result in a large increase in the cost of the concentrator without any direct benefit on performance (apart from pumping homogeneity).

The table below shows the results of simulations regarding various parameters from a perspective of producing laser amplifiers delivering an energy of 100 mJ. Three configurations of the variant of the embodiment of FIG. 9 are compared, choosing two plate thicknesses (0.5 mm and 1 mm) and two powers emitted by the LEDs: 2.5 W and 1 W. This choice of two powers is suggested by the maximum frequency admissible to the LEDs. With a power of 2.5 W, the thermal effects existing in LEDs limit the operating frequency to 100 Hz. By contrast, with a power of 1 W per LED, the LEDs may operate in steady state. In order to limit the thermal power to be evacuated, the frequency of the LEDs is limited to 1 kHz, which will correspond to an average pumping power of 2.9 kW with around 6 kW of average thermal power to be evacuated. The energy stored in the laser plate is equal to the power absorbed in the laser plate multiplied by the lifetime of the laser medium. In the case of an alexandrite crystal heated to 80°, the lifetime is 150 μs. The usable stored energy listed in the table corresponds to the areas where the laser beam passes: it is linked to the overlap between the pump and the laser beam $R_{p/s}$.

| | | Configuration 1: Laser plate thickness 0.5 mm | Configuration 2: Laser plate thickness 1 mm 2.5 W/LED | Configuration 3: Laser plate thickness 1 mm 1 W/LED |
|---|---|---|---|---|
| Dimensions | Concentrator | Lc = 200 mm. wc = 50 mm. ec = 3 mm | Lc = 200 mm. wc = 120 mm. ec = 3 mm | Lc = 200 mm. wc = 120 mm. ec = 3 mm |
| | Laser plate | LL = 50 mm. wL = 14 mm, eL = 0.5 mm | LL = 120 mm. wL = 7 mm. eL = 1 mm | LL = 120 mm. wL = 7 mm. eL = 1 mm |

|  |  | Configuration 1: Laser plate thickness 0.5 mm | Configuration 2: Laser plate thickness 1 mm 2.5 W/LED | Configuration 3: Laser plate thickness 1 mm 1 W/LED |
|---|---|---|---|---|
|  | Beam | wa = 0.45 mm. wb = 7 mm | wa = 0.9 mm. wb = 3.5 mm | wa = 0.9 mm. wb = 3.5 mm |
| LEDs | Power per LED | 2.5 W | 2.5 W | 1 W |
|  | Number of LEDs | 8000 | 19200 | 13200 |
|  | Pumping pulse duration | 150 μs | 150 μs | 150 μs |
|  | Maximum frequency | 100 Hz | 100 Hz | 1 kHz |
| Performance | Rplate | 38% | 38% | 38% |
|  | G0 | 1.48 | 2.04 | 1.26 |
|  | Estored | 0.48 J | 2.03 J | 0.81 J |

For configuration no. 1 (plate of thickness $e_L$=0.5 mm), the calculated gain $G_0$ is satisfactory for producing a "regenerative" multi-pass amplifier. With a stored energy extraction efficiency conventionally greater than 20%, the level of around one hundred millijoules is accessible with this device.

For configuration no. 2, the doubling of thickness (change to $e_L$=1 mm) limits the pump illumination as seen previously. Multiple parameters will be used to compensate for this effect, which would result in reducing gain:
- the length of the laser plate is increased from 50 mm to 120 mm, this resulting in an increase in the number of LEDs by a factor of 2.4 and an amplification of the laser beam over a greater length.
- the beam is smaller horizontally ($w_b$=3.5 mm) and the concentrator has a thickness very close ($e_c$=3 mm) to the size of the beam. This allows the linear gain to be virtually at the maximum value over the entire cross section of the beam, in contrast to configuration no. 1.

The energy stored in configuration no. 2 is far greater than the energy that it is possible to emit without damaging the crystal. This point greatly limits the efficiency of the amplifier. Another way of addressing the problem is to increase the operating frequency as in configuration no. 3 in order to obtain a high-energy laser source emitting pulses with a repetition frequency that reaches 1 kHz. The idea in configuration no. 3 is to sacrifice some of the stored energy and the gain to increase frequency. In this case, the value of the gain (1.26) remains acceptable and an efficiency of the order of 10-15% (linked to the lower gain of the amplifier) would bring the output energy to the desired level of around one hundred mJ.

According to other embodiments illustrated in FIGS. 10-14, the laser system of the invention comprises a plurality of emission modules ME, coupled to the receiving face SR of the laser medium. Using multiple emission modules makes it possible to increase the energy of the amplified beam, by increasing the surface area of the laser beam and by increasing the pumping power. Preferably, the emission modules are identical in order to reduce their manufacturing complexity and their cost. It should be noted that the embodiments illustrated in FIGS. 10-14 are compatible with the use of the coupling prisms PR1 and PR2 from the embodiment of FIG. 8 and the flux mirrors MR1 and MR2 from the embodiment of FIG. 9.

Figure 10:
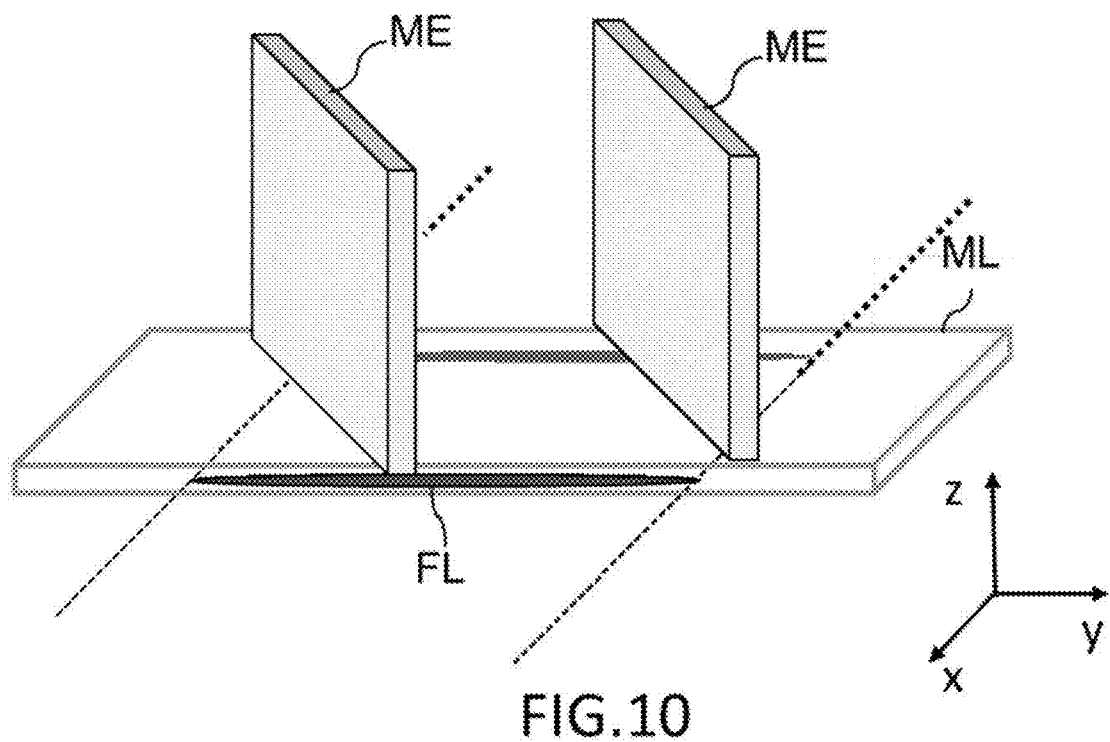
FIG. 10 shows a schematic view of a laser system according to another embodiment of the invention.

In the embodiment illustrated in FIG. 10, the laser assembly comprises two emission modules that are parallel to one another and placed facing one another, forming an angle with the propagation direction of the laser beam. Given the modularity of the T-shaped pumping, this angle may be chosen freely between 0° and 90°:

An angle of 0° (plane of the concentrator CL parallel to the direction of the laser beam as in FIG. 5) makes it possible to couple the pump light into the laser beam over a long length and therefore ensures high gain. The size $w_b$ of the laser beam in the plane of the laser plate is however limited (see FIG. 6B or 7A or 7C) by the area illuminated in the laser plate.

An angle of 90° (plane of the concentrator CL perpendicular to the direction of the laser beam) makes it possible to work with large laser beams $w_b$ ($w_b$ of the order of $w_c$). By contrast, the gain is limited in this configuration since the propagation length "underneath the concentrator" is limited to $e_c$.

An intermediate angle makes it possible to achieve a compromise between the size of the beam $w_b$ and the gain obtained on the beam. Combining multiple inclined concentrators as in FIG. 10 is an additional solution for increasing the size of the beam.

Figure 11:
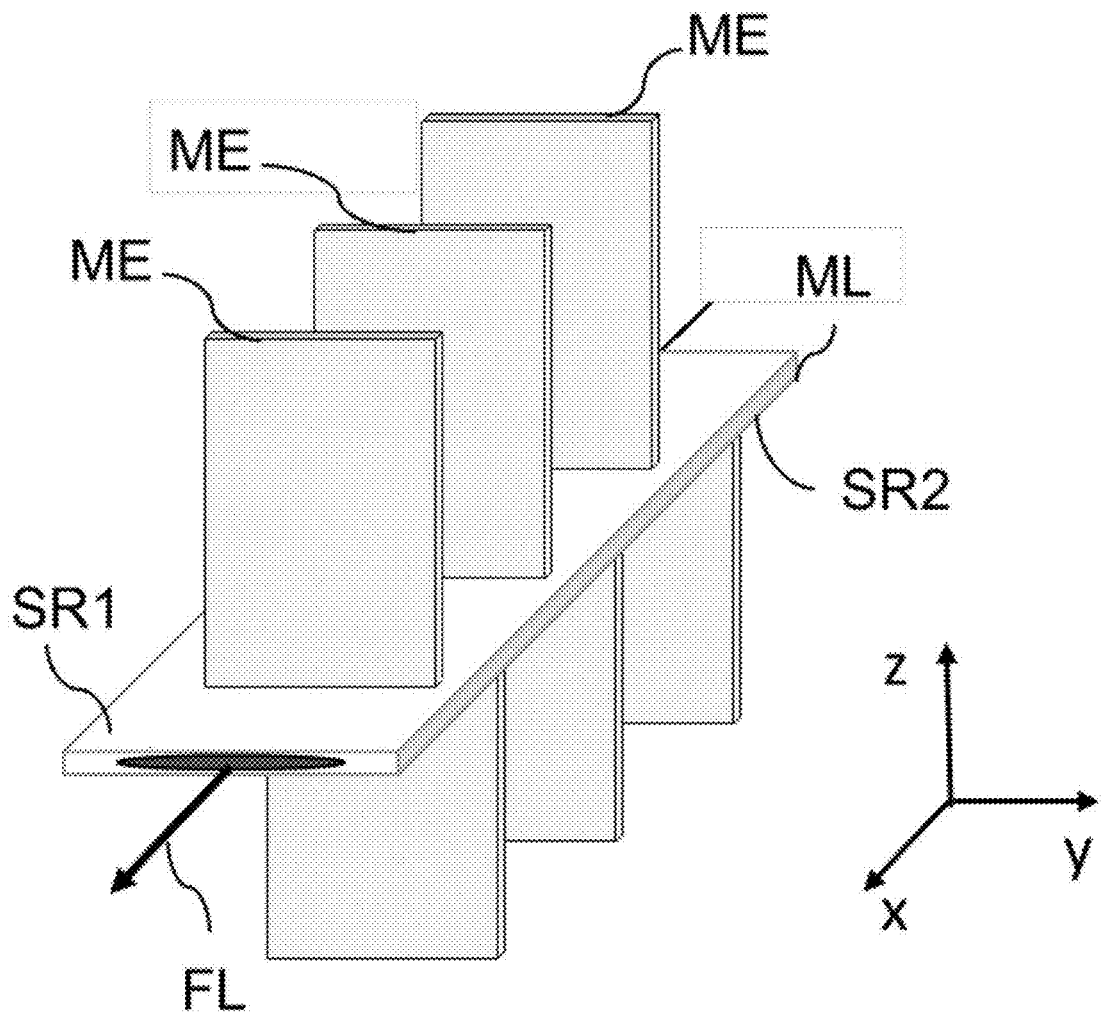
FIG. 11 shows a schematic view of a laser system according to another embodiment of the invention.

As an alternative, according to another embodiment, the laser assembly comprises more than two emission modules that are parallel to one another and placed facing one another, forming an angle with the propagation direction of the laser beam. It is thus possible to obtain homogeneous illumination on a beam of large width and over a long length. In the embodiment of FIG. 11, the laser assembly comprises a first plurality of emission modules that are parallel to one another, placed facing one another and coupled to a first receiving face SR1 of the laser medium. The spacing between the concentrators is linked to the mechanical constraints in terms of the bulk of the LEDs that cover their major faces. In addition, the laser assembly comprises a second plurality of emission modules, parallel to one another and placed facing one another and coupled to a second receiving face SR2 of the laser medium. In the example of FIG. 11, given without limitation, the first plurality and the second plurality comprises three emission modules ME. The modules of the first plurality and of the second plurality are furthermore substantially parallel to one another and the propagation direction of the laser beam Dp is perpendicular to the emission modules. This embodiment makes it possible to pump the laser medium by utilizing the two receiving faces SR1 and SR2. Preferably, the modules of the first plurality and of the second plurality are arranged in a quincunx so as to distribute the pump illumination in the laser medium as best possible.

Figure 12:
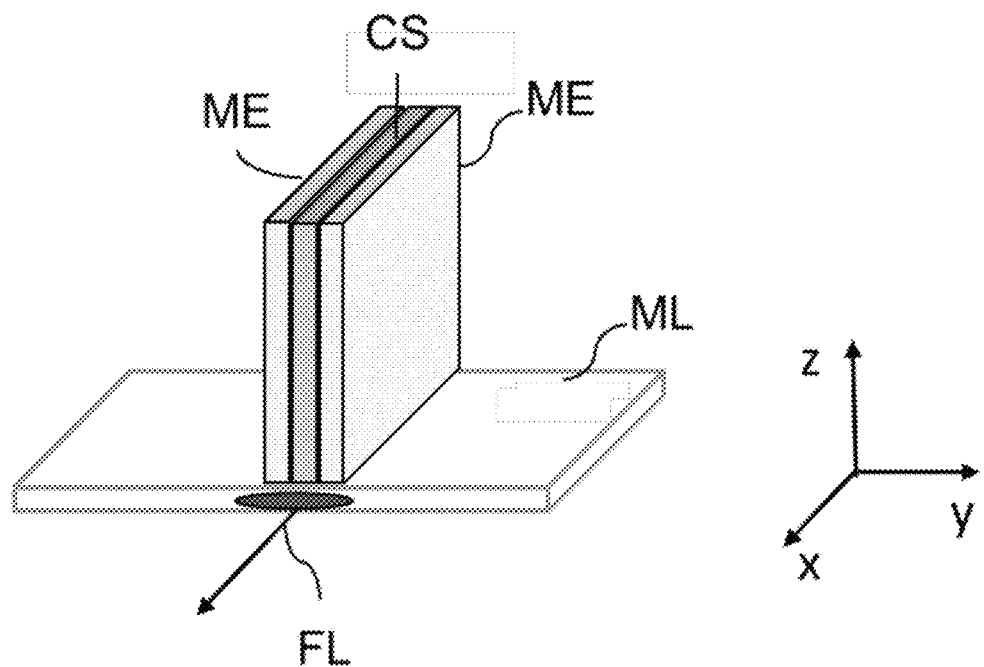
FIG. 12 shows a schematic view of a laser system according to another embodiment of the invention.

In the embodiment of FIG. 12, one of the major faces of an emission module is sacrificed so as to allow cooling by a system, called CS. This configuration is important for controlling the increase in temperature if ME operates in steady state. The number of LEDs is divided by two compared with an ME that would be pumped on both sides. In order to compensate for this loss, FIG. 12 shows that it is possible to pool CS for another ME, placed on the other side of CS. This assembly ME+CS+ME may then become a new pumping assembly able to be oriented with respect to the laser beam. CS should be defined so as to avoid thwarting the total internal reflection of the concentrators. It may be a metal cooling block with a polished surface. It may be made of a transparent material, of very low index, with optical polishing, for example $CaF_2$ (n=1.4), the thermal conductivity of which is high. In the latter case, part of the light from the two concentrators will be coupled by way of CS. The surface illuminated on the plate ML may thereby exhibit increased homogeneity.

Figure 13A:
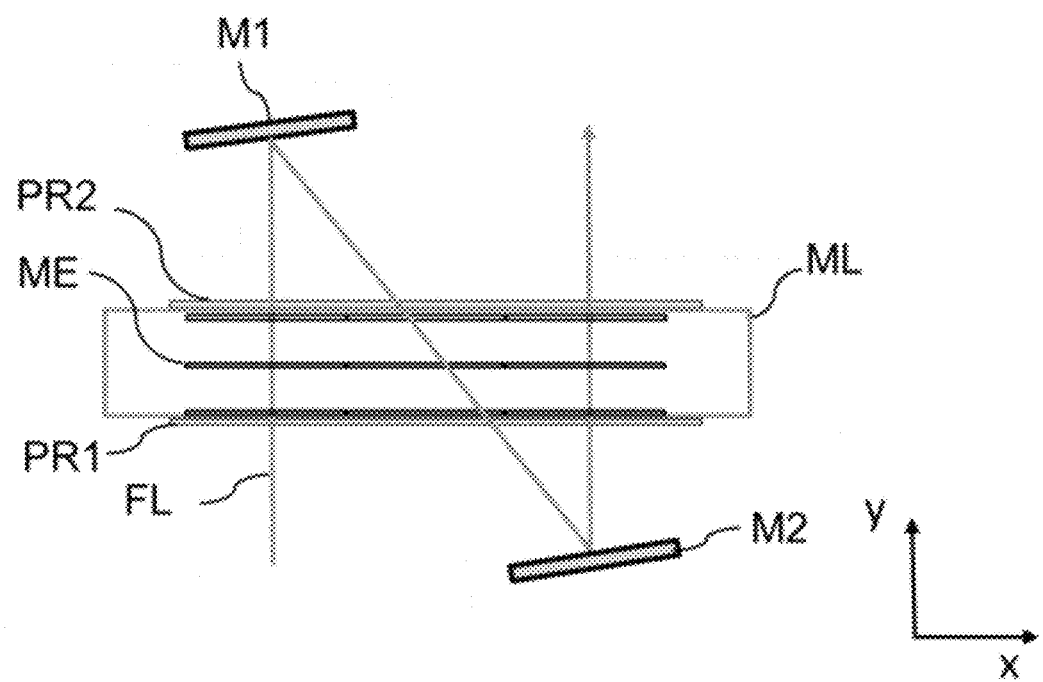
FIG. 13A and FIG. 13B show two schematic views of a laser system according to another embodiment of the invention.
Figure 13B:
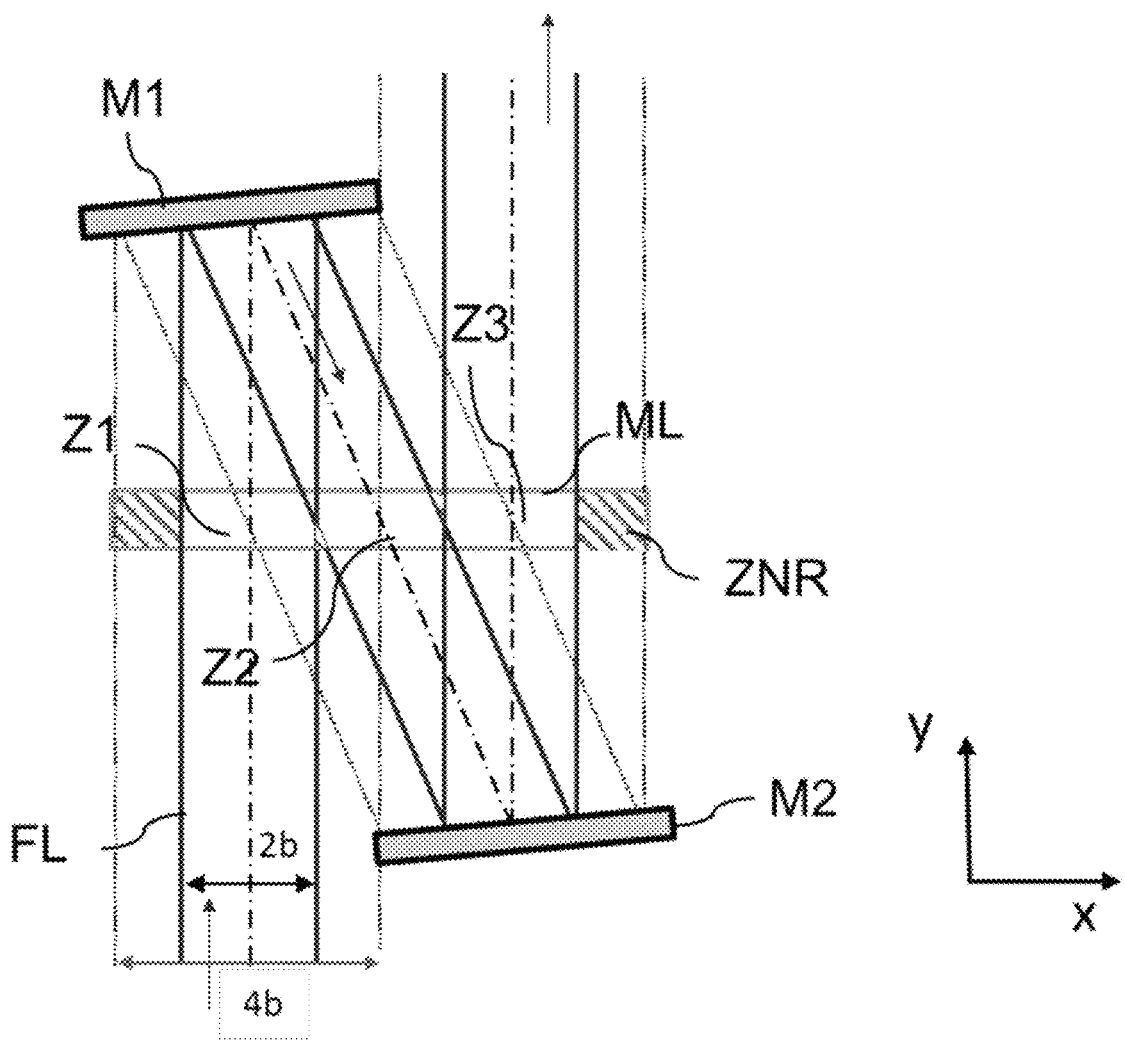

In the embodiment of FIGS. 13A and 13B, the laser beam is folded by two mirrors M1 and M2 so as to propagate into a plurality of different regions Z1, Z2 and Z3 of the laser medium. In addition, the plurality of emission modules ME is arranged above each region Z1, Z2 and Z3. Preferably, this embodiment uses the coupling prisms PR1 and PR2 from the embodiment of FIG. 9 in order to guide, with TIR, the laser beam FL onto the receiving face and its opposing face. In this geometry, the fill level of the laser medium ($R_{plate}$) may be increased in comparison with that from FIG. 9. This embodiment makes it possible to achieve a laser beam with an energy of 1 J.

With an energy of 1 J, the optical damage threshold imposes a beam of horizontal size wb=35 mm and of vertical dimension wa=0.9 mm so as to limit the energy density to 3 J/cm². The laser plate has a thickness $e_L$ of 1 mm. It uses coupling prisms PR1, PR2 that guide the laser beam FL with TIR with an angle of incidence $\theta_v$=65°. In one example given without limitation, the alexandrite laser medium has the following dimensions: $L_L$=140 mm, $w_L$=23 mm and $e_L$=1 mm. The concentrators are used with their width ($w_c$) perpendicular to the laser beam propagating in the direction y. This makes it possible to ensure very homogeneous pumping over the entire cross section of the beam. This point is critical since large beams are highly sensitive to defects. Nine emission modules of width $w_c$=35 mm and of length 200 mm are placed on the laser plate, three for each area. It is expected that the number and placement of the emission modules will be adapted when changing the dimension of the laser plate ML.

FIG. 13B more precisely illustrates how the laser beam is matched to the laser medium so as to limit the effects of diffraction while at the same time maximizing the overlap between the volume of the laser beam in the medium and the total volume of the laser medium. The sides of the laser medium are always placed at a value double the size of the beam in a given plane. The fill level $R_{plate}$ here is 0.56, far better than in the embodiment of FIG. 9. With Ce:YAG emission modules and an alexandrite laser module, calculations show that the usable stored energy is 2.7 J and that the gain of this laser amplifier reaches 1.44 when the medium is passed through. This gain is sufficient for a regenerative amplifier. Output energy reaching a joule is conceivable with this configuration.

Figure 14:
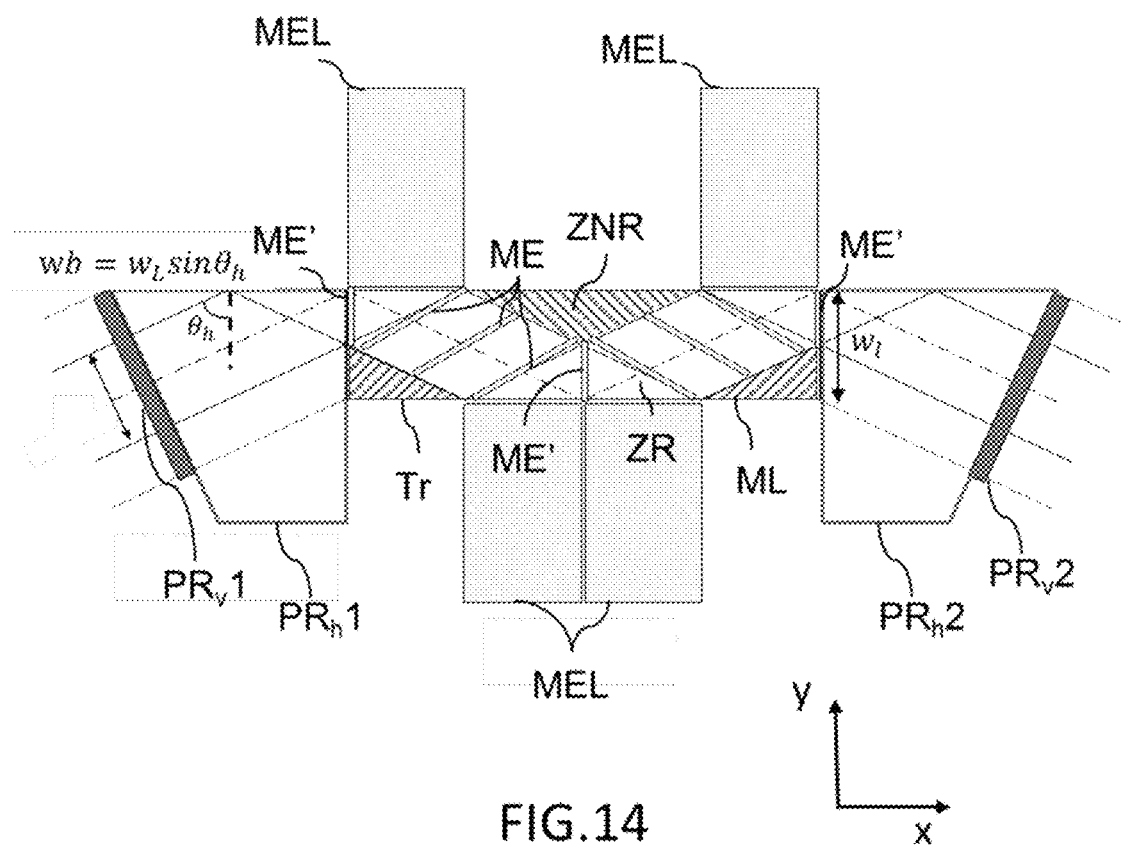
FIG. 14 shows a schematic view of a laser system according to another embodiment of the invention.

In the embodiment of FIG. 14, the principle is that of propagating the laser beam by total internal reflection in the laser medium in the vertical plane (as in FIG. 8) and also in the horizontal plane. For this purpose, two pairs of coupled prisms are used: PRv1 and PRv2 for the vertical plane and PRh1 and PRh2 for the horizontal plane. In the horizontal plane, shown in FIG. 14, the prisms are designed to deflect the laser beam such that it is guided by total internal reflection in the laser medium ML onto two edges Tr of dimensions $e_L \times L_L$ with an angle of incidence on these faces $\theta_h$. Thus, as explained above, it is possible to choose a horizontal dimension of the laser beam such that $w_b \leq w_L \sin \theta_h$, preferably such that $w_b = w_L \sin \theta_h$. In the vertical plane, the angle of incidence of the beam is $\theta_v$. As previously, the size of the beam in the vertical plane is $w_a = e_L \sin \theta_v$.

The laser assembly comprises a first set of emission modules ME coupled to the receiving face SR of the laser medium in a T-shaped pumping configuration. In addition, the laser assembly comprises a second set of emission modules MEL arranged on the laser medium in the horizontal plane xy and coupled to said edges Tr, so as to perform coplanar pumping of the laser medium. Preferably, the emission modules of the second set are placed on said edges in a manner corresponding to regions of reflection of the laser beam guided in said laser medium. This arrangement is advantageous since it allows very high overlap in the horizontal plane $R_{xy}$ between the laser beam in the pumped area and allows very good localization of the illumination close to the concentrator, at the location where the beam is reflected.

In this embodiment, the pumping is said to be "hybrid" as it is performed partially in a T-shaped configuration (by the first set of emission modules) and partially in a coplanar manner (by the second set of emission modules MEL).

Assuming that the angles $\theta_v$ and $\theta_h$ are identical and equal to 65°, a fill level of the laser medium ($R_{plate}$) equal to 0.56 is calculated, greater than configurations 1-3 given in the table. This angle value (65°) is of course dependent on the laser medium and is adapted according thereto. However, it should be noted that, if the laser plates are birefringent, the laser beam evolving in 4 different directions (two in the vertical plane and two in the horizontal plane), it is necessary to correct polarization rotation effects using a quarter-wave plate and a double pass of the beam in the laser plate, returning exactly on itself.

In the embodiment illustrated in FIG. 14, and without limitation, the laser medium is an alexandrite laser plate of $e_L$=2 mm, for a laser plate width of $w_L$=20 mm, with a length of $L_L$=120 mm with an absorption length $L_{abs}$=10 mm associated with the fluorescence radiation of the concentrator of the emission modules. By virtue of the prisms PRv1, PRv2, PRh1 and PRh2, the beam is of size $w_a$=1.8 mm and $w_b$=18.5 mm. On the receiving face of the laser plate above the propagation direction of the laser beam, two types of emission module of the first set are used: 3 emission modules ME' of width 10 mm, placed at the locations where the beam folds back on itself and 6 concentrators of width 20 mm placed on the receiving surface. Simulations show that a concentrator placed on top (in a "T shape") increases the gain by 2.1%. A coplanar concentrator of the same width adapted to the dimension of the areas of reflection on the edge increases the gain by 3.6%. These results are consistent with the calculations presented in FIG. 6C. Taking into account losses in the medium during propagation, a total gain of G0=1.3 is obtained. The usable stored energy is 2 J, slightly lower than in the example of FIGS. 13A and 13B, due to the smaller dimensions of the crystal. It should be noted that this point could easily be improved by increasing the length of the crystal by adding a protrusion to the edge of the laser plate, which would bring the length of the crystal to $L_L$=130 mm (able to be achieved in alexandrite crystals), the gain G0 to 1.46 and the stored energy to 3 J. As mentioned above, this gain value is sufficient for a multi-pass "regenerative" amplifier with energies of the order of a joule.

It is interesting to note that the performance of the laser system according to the embodiment of FIG. 14 and according to the embodiment of FIGS. 13A and 13B are fairly similar, in spite of a different geometry (pumping type, size of the laser beam and plate thickness). This is proof of the modularity of the T-shaped concentrator pumping according to the invention.

As an alternative, according to another embodiment, the two prisms PRh1 and PRh2 may be removed from the assembly. The laser beam is then oriented with a grazing incidence in the horizontal plane (as in FIG. 6B). Hybrid pumping allows a good compromise between gain and energy. However, in this configuration, the overlap $R_{plate}$ is lower and of the order of 0.38.

Of course, the embodiments of FIGS. 8 to 14 may be used equivalently in a laser amplifier and in a laser oscillator. In other words, the systems of FIGS. 8 to 14 may be used to amplify a laser beam generated by another laser or be inserted into a laser cavity in order to form a laser oscillator. In both cases, oscillator or amplifier, the operating mode may be continuous, quasi-continuous or pulsed, with pulses possibly ranging from a second to a femtosecond.

The invention claimed is:

1. A laser pumping assembly comprising:
 a parallelepipedal solid laser medium (ML) having the shape of a plate in a horizontal plane (xy) and a thickness $e_L$, said laser medium having an absorption spectral band and an associated absorption coefficient α;
 at least one light emission module (ME) intended to pump the laser medium, comprising:
 a plurality of light-emitting diodes (LED) configured to emit electroluminescent radiation ($L_d$) at a wavelength $\lambda_d$;
 a fluorescent parallelepipedal crystal called a concentrator (CL), having the shape of a plate of thickness $e_c$, said concentrator having at least one illumination face ($SI_1$, $SI_2$) illuminated by said electroluminescent radiation ($L_d$) and being configured to absorb said electroluminescent radiation ($L_d$) and emit fluorescence radiation in a spectral range exhibiting an overlap with said absorption spectral band, said concentrator having an emitting face (SE) having dimensions $e_c \times w_c$, $w_c$ being a width of the concentrator;
said concentrator being in optical contact, via said emitting face (SE), with a receiving face (SR, SR1, SR2) of the laser medium, said concentrator being arranged perpendicular to the laser medium such that the one or more illumination faces ($SI_1$, $SI_2$) are perpendicular to said receiving face so as to perform transverse pumping of said laser medium,
the optical contact being designed such that a portion ($L_g$) of said fluorescence radiation trapped in the concentrator (CL) by total internal reflection is able to pass into the laser medium (ML) by passing through said emitting face (SE), and be trapped in the laser medium (ML) by total internal reflection,
said thickness $e_L$ of the laser medium being such that $e_L \leq L_{abs}/10$ where $L_{abs}=1/\alpha$ is an absorption length of the laser medium.

2. The laser pumping assembly as claimed in claim 1, wherein a ratio between a surface area of the receiving face (SR) of the laser medium and a surface area of the emitting face of the concentrator (SE) is greater than 5, and wherein a ratio between a surface area of the illumination face of the concentrator and a surface area of the emitting face of the concentrator is greater than or equal to 100.

3. The laser pumping assembly as claimed in claim 1, comprising at least a first recycling mirror (MR1) coupled to an exit face of the concentrator (FSC) opposite said emitting face and/or a second recycling mirror (MR2) coupled to a face of the laser medium (SR2) opposite said receiving face.

4. A laser system comprising the laser pumping assembly as claimed in claim 1 and at least two cavity mirrors (M1, M2) so as to form a laser cavity wherein the assembly is arranged, a laser beam (FL) propagating in said laser medium in a propagation direction (Dp), passing through two opposing faces, called laser faces (SL), each having dimensions $e_L \times w_L$, $w_L$ being called transverse dimension, and at least one emission module of the laser pumping assembly performing transverse pumping of the laser medium.

5. The laser system as claimed in claim 4, wherein the laser cavity is configured such that a horizontal dimension of the laser beam wp and a vertical dimension $w_a$ on each laser face is less than, respectively, half the transverse dimension of the laser face and half the horizontal dimension of the laser face, such that $w_b \leq w_L/2$ in the horizontal plane and $w_a \leq e_L/2$ in the vertical plane.

6. The laser system as claimed in claim 5, wherein the laser cavity is configured such that the propagation direction of the laser beam (Dp) in the laser medium is parallel to the concentrator and such that the laser beam propagates below the concentrator, said width $w_c$ of the concentrator being equal to a length $L_L$ of the laser medium such that the laser beam is amplified over all of its propagation in the laser medium.

7. The laser system as claimed in claim 4, furthermore comprising a first and a second coupling prism (PR1, PR2) coupled respectively to a laser face, said prisms being configured to deflect said laser beam such that it is guided by total internal reflection in said laser medium onto the receiving face and a face opposite said receiving face, the cavity being designed such that a vertical dimension of the laser beam $w_a$ is such that $w_a \leq e_L \sin \theta_v$, where $\theta_v$ is an angle of incidence of the laser beam on said receiving face.

8. The laser system as claimed in claim 4, comprising a plurality of emission modules coupled to the receiving face (SR) of the laser medium.

9. The laser system as claimed in claim 8, wherein said plurality consists of a first and a second emission module arranged side-by-side and substantially parallel to one another, said system furthermore comprising an LED-cooling system (CS) arranged between the first and the second emission module, the laser beam propagating parallel to and below the concentrators of the first and the second emission module, such that the laser beam is amplified in a region pumped simultaneously by the first and the second emission module, the cooling system consisting of metal materials or high-optical-quality transparent materials.

10. The laser system as claimed in claim 8, comprising:
 a first plurality of emission modules, parallel to one another and placed facing one another and coupled to a first receiving face (SR1) of the laser medium,
 a second plurality of emission modules, parallel to one another and placed facing one another and coupled to a second receiving face (SR2) of the laser medium,
the modules of the first plurality and of the second plurality furthermore being substantially parallel to one another, the propagation direction of the laser beam (Dp) being perpendicular to the emission modules, the modules of the first plurality and of the second plurality being arranged in a quincunx.

11. The laser system as claimed in claim 4, wherein the laser cavity is designed such that the laser beam propagates in a plurality of different regions of the laser medium, a plurality of identical emission modules being arranged above each region.

12. The laser system as claimed in claim 4, comprising:
 a first and a second prism coupled respectively to a laser face, said prisms being designed to deflect said laser beam such that it is guided by total internal reflection in said laser medium onto two faces, called edges (Tr), of dimensions $e_L \times L_L$;
 a first set of emission modules coupled to the receiving face (SR) of the laser medium; a second set of emission modules (MEL) arranged on the laser medium in the horizontal plane (xy) and coupled to said edges (Tr), so as to perform coplanar pumping of the laser medium, a horizontal dimension of the laser beam being such that $w_b \leq w_L \sin \theta_h$, where $\theta_h$ is an angle of incidence of the beam incident on said laser edges.

13. The system as claimed in claim 12, wherein the emission modules of the second set are placed on said edges in a manner corresponding to regions of reflection of the laser beam guided in said laser medium.

14. A laser amplifier comprising the laser pumping assembly as claimed in claim 1, at least one emission module of the laser pumping assembly performing transverse pumping of the laser medium, a laser beam (FL) being incident on said laser amplifier and propagating in said laser medium in a propagation direction (Dp), passing through two opposing faces, called laser faces (SL), each having dimensions $e_L \times w_L$.

15. The laser system as claimed in claim 12, wherein the first set of emission modules is a set of identical emission modules.

* * * * *